United States Patent
Ryu et al.

(10) Patent No.: US 9,431,830 B2
(45) Date of Patent: Aug. 30, 2016

(54) APPARATUS AND METHOD FOR WIRELESS POWER TRANSMISSION

(75) Inventors: Young Ho Ryu, Yongin-si (KR); Eun Seok Park, Suwon-si (KR); Sang Wook Kwon, Seongnam-si (KR); Yun Kwon Park, Dongducheon-si (KR); Young Tack Hong, Seongnam-si (KR); Ki Young Kim, Yongin-si (KR); Nam Yun Kim, Seoul (KR); Dong Zo Kim, Yongin-si (KR); Jin Sung Choi, Gimpo-si (KR); Chang Wook Yoon, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 761 days.

(21) Appl. No.: 13/463,354

(22) Filed: May 3, 2012

(65) Prior Publication Data
US 2012/0286581 A1 Nov. 15, 2012

(30) Foreign Application Priority Data

May 12, 2011 (KR) .......... 10-2011-0044395

(51) Int. Cl.
*H02J 5/00* (2016.01)
(52) U.S. Cl.
CPC ...................... *H02J 5/005* (2013.01)
(58) Field of Classification Search
CPC ........ H02J 17/00; H02J 5/005; B60L 11/182
USPC ......................................................... 307/104
See application file for complete search history.

(56) References Cited

U.S. PATENT DOCUMENTS

| | | | | |
|---|---|---|---|---|
| 5,694,045 A | * | 12/1997 | Ikeda | A63F 9/04 273/145 R |
| 9,294,154 B2 | * | 3/2016 | Ghovanloo | H04B 5/0037 |
| 2004/0070548 A1 | * | 4/2004 | Cake | H01Q 9/265 343/803 |
| 2009/0058189 A1 | * | 3/2009 | Cook | H04B 5/0037 307/104 |
| 2010/0117454 A1 | * | 5/2010 | Cook | G06K 7/0008 307/104 |
| 2010/0127660 A1 | * | 5/2010 | Cook | H01Q 1/248 320/108 |
| 2010/0201311 A1 | * | 8/2010 | Lyell Kirby | A61L 2/02 320/108 |
| 2010/0217553 A1 | * | 8/2010 | Von Novak | H04B 5/0056 702/65 |

* cited by examiner

*Primary Examiner* — Thienvu Tran
*Assistant Examiner* — David M Stables
(74) *Attorney, Agent, or Firm* — NSIP Law

(57) ABSTRACT

An apparatus and method for controlling a magnetic field when power is wirelessly transmitted are provided. According to one general aspect, a wireless power transmitter may include: a source resonator configured to wirelessly transmit power to a target device including at least one sub-resonator located there within; and a magnetic field distribution controller configured to control the distribution of the magnetic field within the resonator based the resonance frequency of the at least one sub-resonator and the resonance frequency of the source resonator.

20 Claims, 18 Drawing Sheets

$$\omega_{MZR} = \frac{1}{\sqrt{L_R C_L}}$$

APPARATUS AND METHOD FOR WIRELESS POWER TRANSMISSION

CROSS-REFERENCE TO RELATED APPLICATION(S)

This application claims the benefit under 35 U.S.C. §119 (a) of Korean Patent Application No. 10-2011-0044395, filed on May 12, 2011, in the Korean Intellectual Property Office, the entire disclosure of which is incorporated herein by reference for all purposes.

BACKGROUND

1. Field

The following description relates to wireless power transmission.

2. Description of Related Art

Wireless power refers to energy that is transferred from a wireless power transmitter to a wireless power receiver, for example, through a magnetic coupling or a resonance coupling. Accordingly, a wireless power transmission system includes a source electronic device and a target electronic device. The source electronic device may wirelessly transmit a power, and the target electronic device may wirelessly receive a power. The source electronic device includes a source resonator, and the target electronic device includes a target resonator. A magnetic coupling or resonance coupling may be formed between the source resonator and the target resonator. Generally, the strength of a magnetic field formed in a source resonator of a pad type may vary depending on a position of the source resonator.

SUMMARY

According to one general aspect, a wireless power transmitter may include: a source resonator configured to wirelessly transmit power to a target device including at least one sub-resonator located there within; and a magnetic field distribution controller configured to control the distribution of the magnetic field within the resonator based the resonance frequency of the at least one sub-resonator and the resonance frequency of the source resonator.

The source resonator may include: a first transmission line comprising a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically connecting the second signal conducting portion to the first ground conducting portion; and at least one first capacitor inserted between the first signal conducting portion and the second signal conducting portion, in series with respect to current flowing through the first signal conducting portion and the second signal conducting portion.

The first transmission line, the first conductor, and the second conductor may form a loop structure.

The wireless power transmitter may further include: a matcher configured to determine an impedance of the source resonator, the matcher being located within the loop structure.

The magnetic field distribution controller may control the resonance frequency of the at least one sub-resonator to have a value greater than the resonance frequency of the source resonator, so that the strength of the magnetic field within the at least one sub-resonator is increased and the strength of the magnetic field in a region between the at least one sub-resonator and the source resonator is reduced.

The magnetic field distribution controller may control the resonance frequency of the at least one sub-resonator to have a value less than the resonance frequency of the source resonator, so that the strength of the magnetic field within the at least one sub-resonator is reduced and the strength of the magnetic field in a region between the at least one sub-resonator and the source resonator is increased.

The magnetic field distribution controller may control one or more resonance frequencies of a plurality of sub-resonators located in a predetermined area within the source resonator to have values less than or greater than the resonance frequency of the source resonator, and controls the strength of the magnetic field within one or more of the plurality of sub-resonators, and the strength of the magnetic field in a region between the source resonator and one or more of the plurality of sub-resonators.

The source resonator comprises a spiral resonator may be formed by winding a coil in a spiral shape.

The at least one sub-resonator may include: a second transmission line comprising a third signal conducting portion, a fourth signal conducting portion, and a second ground conducting portion, the second ground conducting portion corresponding to the third signal conducting portion and the fourth signal conducting portion; a third conductor electrically connecting the third signal conducting portion to the second ground conducting portion; a fourth conductor electrically connecting the fourth signal conducting portion to the second ground conducting portion; and at least one second capacitor inserted between the third signal conducting portion and the fourth signal conducting portion, in series with respect to current flowing through the third signal conducting portion and the fourth signal conducting portion.

The magnetic field distribution controller may control the resonance frequency of the at least one sub-resonator, by controlling a capacitance of the at least one second capacitor, and/or the length, the width, or both of the second transmission line.

The second transmission line, the third conductor, and the fourth conductor may form a rectangular loop structure.

The second transmission line, the third conductor, and the fourth conductor may form a circular loop structure.

The second transmission line, the third conductor, and the fourth conductor may form a cross-shaped loop structure.

The at least one sub-resonator may include: at least one sub-sub-resonator that is located within the at least one sub-resonator that is configured to support the at least one sub-resonator and to increase or reduce the strength of the magnetic field when the power is wirelessly transmitted.

The at least one sub-resonator may include: a meta-resonator, a spiral resonator, or a helical resonator.

The magnetic field distribution controller may control the distribution of the magnetic field within the resonator based on a ratio of the resonance frequency of the at least one sub-resonator with respect to the resonance frequency of the source resonator.

According to another general aspect, a wireless power transmission method may include: wirelessly transmitting power to a target device via a source resonator; and controlling, by at least one sub-resonator within the source resonator, the distribution of the magnetic field based the resonance frequency of the at least one sub-resonator and the resonance frequency of the source resonator, the at least one sub-resonator being located in a predetermined area within the source resonator.

The controlling may include controlling the resonance frequency of the at least one sub-resonator to have a value greater than the resonance frequency of the source resonator, so that the strength of the magnetic field formed in the at least one sub-resonator is increased and the strength of the magnetic field formed between the at least one sub-resonator and the source resonator is reduced.

The controlling may include controlling the resonance frequency of the at least one sub-resonator to have a value less than the resonance frequency of the source resonator, so that the strength of the magnetic field formed in the at least one sub-resonator is reduced and the strength of the magnetic field formed between the at least one sub-resonator and the source resonator is increased.

The controlling may include controlling one or more of resonance frequencies of a plurality of sub-resonators located in a predetermined area within the source resonator to have values less than or greater than the resonance frequency of the source resonator, and controlling the strength of the magnetic field within one or more of the plurality of sub-resonators, and the strength of the magnetic field in a region between the source resonator and one or more of the plurality of sub-resonators.

The controlling may include controlling the resonance frequency of the at least one sub-resonator, by controlling a capacitance of at least one capacitor, and/or the length, the width, or both, of a transmission line.

The controlling may include controlling the distribution of the magnetic field based on the ratio of the resonance frequency of the at least one sub-resonator with respect to the resonance frequency of the source resonator.

Other features and aspects will be apparent from the following detailed description, the drawings, and the claims.

Figure 1:
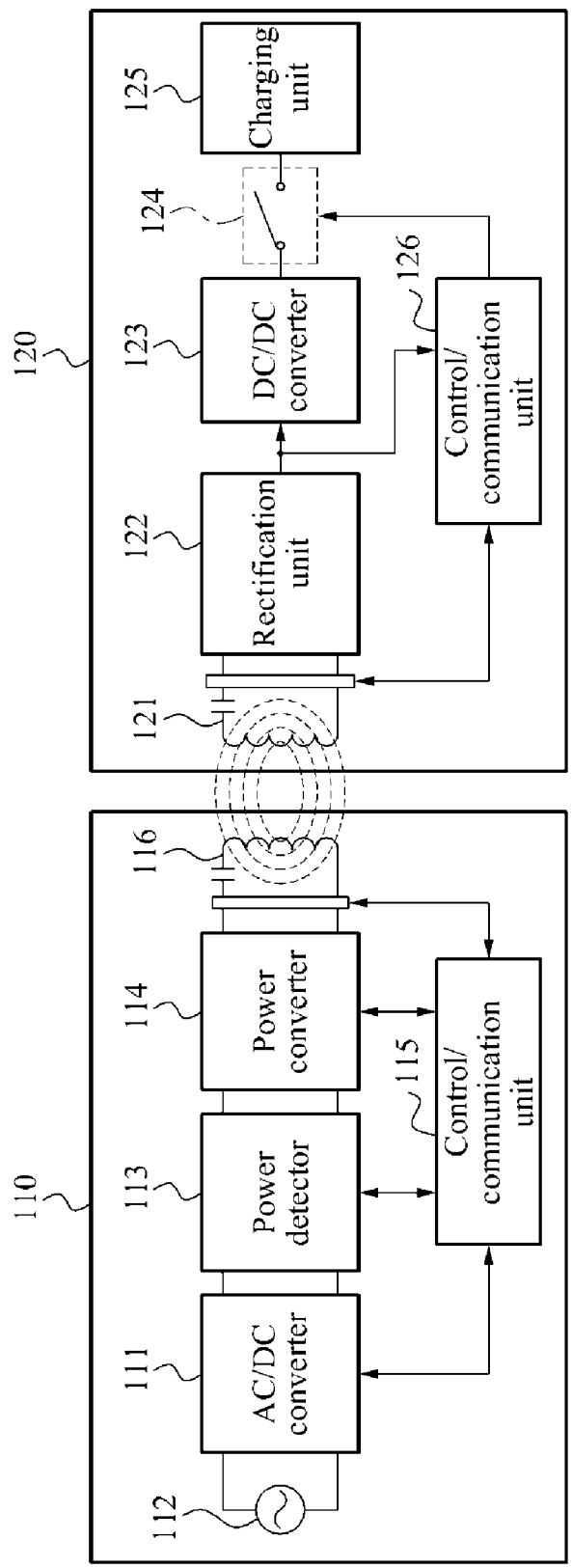
FIG. 1 is a diagram illustrating a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a wireless power transmission system.

As shown, the wireless power transmission system includes a source device 110, and a target device 120.

The source device 110 may include an alternating current-to-direct current (AC/DC) converter 111, a power detector 113, a power converter 114, a control/communication unit 115, and a source resonator 116.

The target device 120 may include a target resonator 121, a rectification unit 122, a DC-to-DC (DC/DC) converter 123, a switch unit 124, a charging unit 125, and a control/communication unit 126.

The AC/DC converter 111 may be configured to generate DC voltage, for example, by rectifying AC voltage (e.g., in a band of tens of hertz (Hz)) output from a power supply 112. The AC/DC converter 111 may be configured to output DC voltage of a predetermined level, and/or may adjust an output level of DC voltage based on the control of the control/communication unit 115.

The power detector 113 may detect current and voltage output from the AC/DC converter 111, and may transfer, to the control/communication unit 115, information on the detected current and the detected voltage. Additionally, the power detector 113 may detect current and voltage input to the power converter 114.

The power converter 114 may generate power by converting DC voltage of a predetermined level to AC voltage, for example, using a switching pulse signal in a band of a few megahertz (MHz) to tens of MHz.

The power converter 114 may convert DC voltage to AC voltage, for example, using a resonance frequency, and may generate communication power used for communication, charging power used for charging, or both. The communication power and the charging power may be used in the target device 120. The communication power refers to an energy used to activate a communication module and a processor of the target device 120 and accordingly, may be referred to as wake-up power. Additionally, the communication power may be transmitted in the form of a constant wave (CW) for a predetermined period of time. The charging power refers to an energy used to charge a battery connected to the target device 120 or a battery included in the target device 120. The charging power may continue to be transmitted for a predetermined period of time, at a higher power level than the communication power. For example, the communication power may have a power level of 0.1 Watt (W) to 1 W, and the charging power may have a power level of 1 W to 20 W.

The control/communication unit 115 may control a frequency of a switching pulse signal. Under the control of the control/communication unit 115, the frequency of the switching pulse signal may be determined. By controlling the power converter 114, the control/communication unit 115 may generate a modulation signal to be transmitted to the target device 120. In one or more embodiments, the control/communication unit 115 may transmit various messages to the target device 120 using an in-band communication. Additionally, the control/communication unit 115 may detect a reflected wave, and may demodulate a signal received from the target device 120 through an envelope of the detected reflected wave.

The control/communication unit 115 may generate a modulation signal for in-band communication, using various schemes. To generate a modulation signal, the control/communication unit 115 may turn ON or OFF a switching pulse signal, and/or may perform delta-sigma modulation. Additionally, the control/communication unit 115 may generate a pulse-width modulation (PWM) signal with a predetermined envelope.

The control/communication unit 115 may perform an out-band communication that employs a separate communication channel, instead of a resonance frequency. The control/communication unit 115 may include a communication module, such as one configured to process ZigBee, Bluetooth, Wi-Fi, and Wi-Max communications and the like. The control/communication unit 115 may transmit or receive data to or from the target device 120 using the out-band communication.

The source resonator 116 may transfer an electromagnetic energy to the target resonator 121. In various implementations, the source resonator 116 may transfer, to the target device 120, the communication power or charging power, using a magnetic coupling with the target resonator 121.

The target resonator 121 may receive the electromagnetic energy from the source resonator 116. For instances, the target resonator 121 may receive, from the source device 110, the communication power or charging power, using the magnetic coupling with the source resonator 116. Additionally, the target resonator 121 may receive various messages from the source device 110 using the in-band communication.

The rectification unit 122 may generate DC voltage by rectifying AC voltage received from the target resonator 121.

The DC/DC converter 123 may be configured to adjust the level of the DC voltage output from the rectification unit 122 based on a capacity of the charging unit 125. For example, the DC/DC converter 123 may adjust the level of the DC voltage output from the rectification unit 122 from 3 volt (V) to 10 V.

The switch unit 124 may be turned ON or OFF, under the control of the control/communication unit 126. When the switch unit 124 is turned OFF, the control/communication unit 115 of the source device 110 may detect a reflected wave and the magnetic coupling between the source resonator 116 and the target resonator 121 may be eliminated in some instances.

The charging unit 125 may include at least one battery. The charging unit 125 may charge the at least one battery using DC voltage output from the DC/DC converter 123.

The control/communication unit 126 may perform in-band communication for transmitting or receiving data using a resonance frequency. During the in-band communication, the control/communication unit 126 may demodulate a received signal by detecting a signal between the target resonator 121 and the rectification unit 122, and/or detecting an output signal of the rectification unit 122. The control/communication unit 126 may demodulate a message received using the in-band communication.

Additionally, the control/communication unit 126 may adjust an impedance of the target resonator 121, to modulate a signal to be transmitted to the source device 110. Specifically, the control/communication unit 126 may modulate the signal to be transmitted to the source device 110, by turning ON or OFF the switch unit 124. For example, the control/communication unit 126 may increase the impedance of the target resonator 121 so that a reflected wave may be detected from the control/communication unit 115 of the source device 110. Depending on whether the reflected wave is detected, the control/communication unit 115 may detect a binary number (e.g., "0" or "1").

The control/communication unit 126 may also perform an out-band communication that employs a communication channel. The control/communication unit 126 may include a communication module, such as one configured to process ZigBee, Bluetooth, Wi-Fi, and Wi-Max communications and the like. The control/communication unit 126 may transmit and/or receive data to or from the source device 110, using the out-band communication.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

Figure 2:
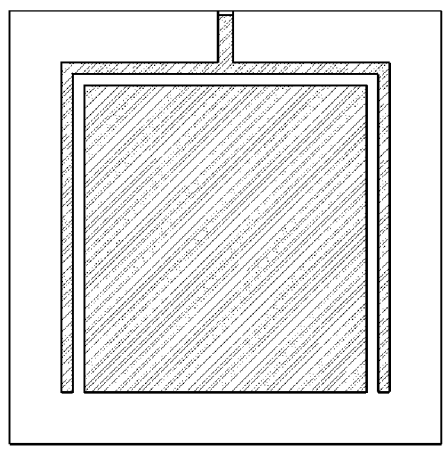
FIGS. 2 through 4 are diagrams illustrating distribution of a magnetic field formed within various types of source resonators.
Figure 2:
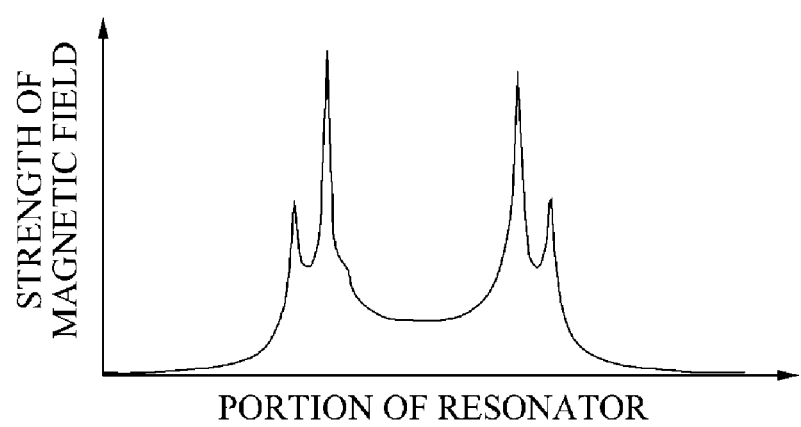
Figure 3:
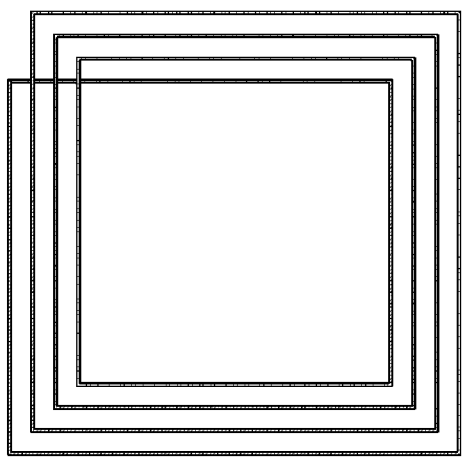
Figure 3:
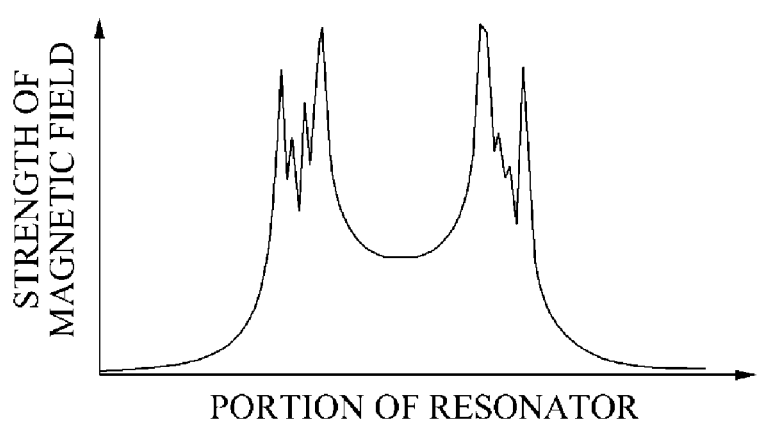
Figure 4:
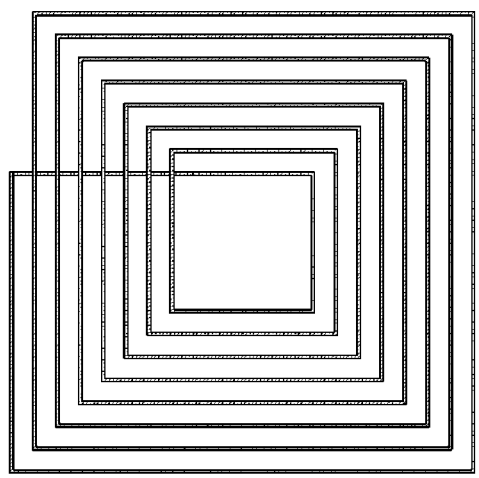
Figure 4:
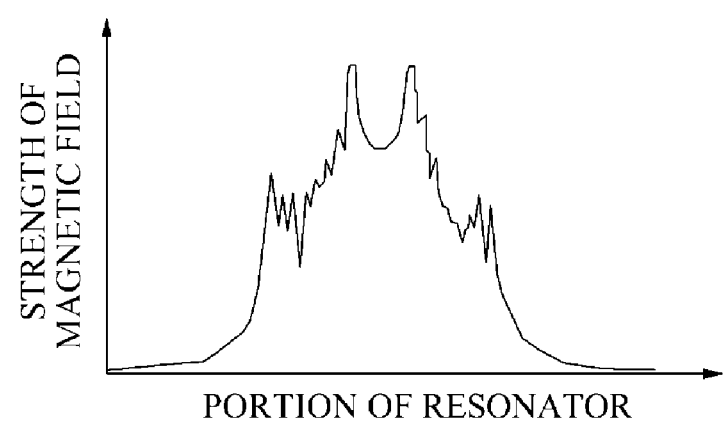

FIGS. 2 through 4 illustrate distribution of a magnetic field formed within various types of source resonator.

FIG. 2 illustrates a loop resonator. The loop resonator may include a matcher. The strength of a magnetic field formed within the loop resonator may vary depending on a portion of the loop resonator in which the magnetic field is formed. In some instances, the magnetic field may be randomly distributed. Referring to the graph illustrated in FIG. 2, the strength of the magnetic field is higher in outer edges of the loop resonator than in the center of the loop resonator.

FIG. 3 illustrates a spiral resonator configured by winding a coil in a spiral shape. For example, the spiral resonator of FIG. 3 may be configured by winding the coil four times in the spiral shape. The strength of a magnetic field formed within the spiral resonator may vary depending on a portion of the spiral resonator in which the magnetic field formed. Referring to the graph illustrated in FIG. 3, the strength of the magnetic field is higher near the outer edges of the spiral resonator than in the center of the spiral resonator.

FIG. 4 illustrates another spiral resonator. The spiral resonator of FIG. 4 may be formed by winding a coil eight times, in a different manner from the spiral resonator of FIG. 3 configured by winding the coil four times. Typically, the strength of the magnetic field may increase in the center of a spiral resonator as a number of times a coil is wound. In contrast to the spiral resonator illustrated in FIG. 3, the strength of the magnetic field formed within the spiral resonator of FIG. 4 may be higher at or near the center of the spiral resonator than in outer edges of the spiral resonator.

As described above, the magnetic field formed within the source resonator may be randomly distributed, regardless of whether the source resonator has a loop structure or a spiral structure. Thus, the strength of the magnetic field may increase in a predetermined portion of the source resonator, but may decrease in another portion thereof.

Since the magnetic field formed within the source resonator is randomly distributed, a value of an input impedance viewed in a direction from the source resonator to a target device may vary depending on a position of the target device positioned on the source resonator. When the value of the input impedance is variable, complex technologies may be additionally required so that a wireless power transmitter may perform impedance matching. Accordingly, the wireless power transmission efficiency may be reduced.

Figure 5:
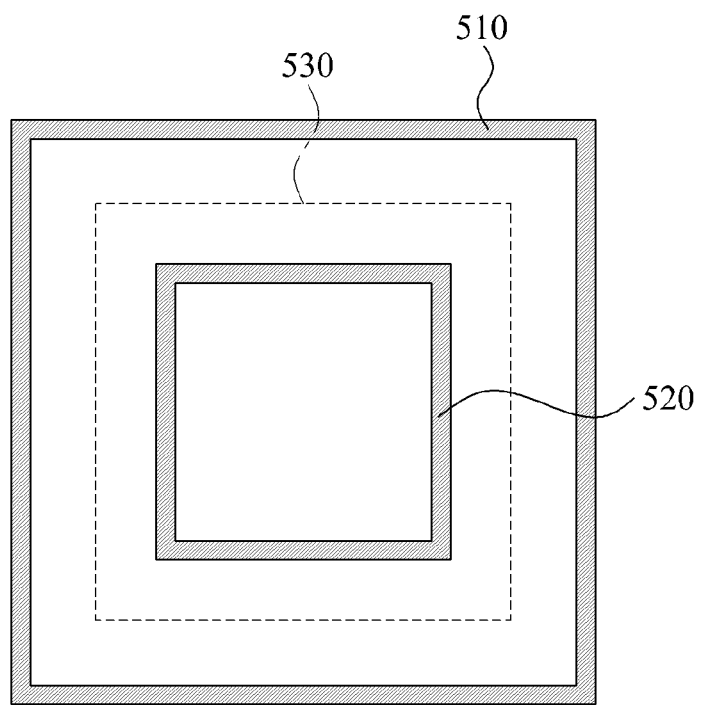
FIG. 5 is a diagram illustrating a wireless power transmitter.

FIG. 5 illustrates a wireless power transmitter.

As shown, the wireless power transmitter includes a source resonator 510, a sub-resonator 520, and a magnetic field distribution controller 530.

The source resonator 510 may form a magnetic coupling with a target resonator. The source resonator 510 may wirelessly transmit a power to a target device through the magnetic coupling, for instance. The source resonator 510 has a loop structure as illustrated in FIG. 5, however, may have various structures, such as, for example, a spiral-shaped structure, a helical-shaped structure, or the like.

Additionally, the wireless power transmitter may include a matcher to be used in impedance matching. The matcher may be appropriately configured to adjust the strength of a magnetic field of the source resonator 510. An impedance of the source resonator 510 may be determined by the matcher. The matcher may have the same or similar shape or structure as the source resonator 510. Additionally, to adjust the strength of the magnetic field, the matcher may have a predetermined location relationship with a capacitor located in the source resonator 510. For example, the matcher may be electrically connected to the source resonator 510 in both ends of the capacitor.

In one implementation, the matcher may be located within a loop formed by the loop structure of the source resonator 510. The matcher may adjust the impedance of the source resonator 510 by changing the physical shape of the matcher.

The sub-resonator 520 may be located within the source resonator 510. In the source resonator 510, one or more sub-resonators may be located. Additionally, in the sub-resonator 520, a sub-sub-resonator may be located. The sub-resonator 520 may have an influence on distribution of a magnetic field formed in the source resonator 510. For example, a magnetic field may be formed due to a current flowing in the source resonator 510, and the formed magnetic field may induce another current to the sub-resonator 520. The distribution of the magnetic field formed within the source resonator 510 may be determined based on a direction of the current flowing in the source resonator 510 and a direction of the current flowing in the sub-resonator 520. Additionally, the direction of the current flowing in the sub-resonator 520 may be determined based on a ratio of the resonance frequency of the sub-resonator 520 with respect to the resonance frequency of the source resonator 510.

The resonance frequency of the source resonator 510 may be determined based on an inductance value L and a capacitance value C of the source resonator 510. Similarly, the resonance frequency of the sub-resonator 520 may be determined based on the inductance value and the capacitance value of the sub-resonator 520.

The magnetic field distribution controller 530 may be located in a predetermined area within the source resonator 510, for example. The magnetic field distribution controller 530 may be configured to control the direction of the current flowing in the source resonator 510 or the direction of the current flowing in the sub-resonator 520, and may control the distribution of the magnetic field formed within the source resonator 510.

The direction of the current flowing in the source resonator 510 or the direction of the current flowing in the sub-resonator 520 may be determined based on the ratio of the resonance frequency of the sub-resonator 520 with respect to the resonance frequency of the source resonator 510.

The magnetic field distribution controller 530 may control the resonance frequency of the source resonator 510, the resonance frequency of the sub-resonator 520, or both. For example, the magnetic field distribution controller 530 may change the capacitance of the source resonator 510 in order to control the resonance frequency of the source resonator 510. Additionally or alternatively, the magnetic field distribution controller 530 may adjust the capacitance and the inductance of the sub-resonator 520 in order to control the resonance frequency of the sub-resonator 520. The magnetic field distribution controller 530 may control the inductance value of the sub-resonator 520 by adjusting the length and/or the width of the sub-resonator 520.

The magnetic field distribution controller 530 may control the direction of the current flowing in the source resonator 510, the direction of the current flowing in the sub-resonator 520, or both, so that the strength of the magnetic field formed within the source resonator 510 may be increased or reduced. One example in which the strength of the magnetic field is increased or reduced will be further described with reference to FIG. 6.

Additionally, the magnetic field distribution controller 530 may be configured to control the distribution of the magnetic field, so that the magnetic field may be substantially uniformly distributed in the source resonator 510. For example, the magnetic field distribution controller 530 may control the resonance frequency of the sub-resonator 520, and may control the magnetic field to be uniformly distributed in the source resonator 510. One configuration of the sub-resonator 520 will be further described with reference to FIG. 8.

The magnetic field distribution controller 530 may use a sub-sub-resonator to control the distribution of the magnetic field formed within the source resonator 510. The magnetic field distribution controller 530 may control a resonance frequency of the sub-sub-resonator, and may adjust for the distribution of the magnetic field formed within the source resonator 510, so that the magnetic field may be uniformly distributed. The magnetic field distribution controller 530 may control the direction of the current flowing in the sub-resonator 520, and the direction of the current flowing in the sub-sub-resonator, or both, and may control the distribution of the magnetic field. The sub-sub-resonator may be located within the sub-resonator 520, for example. The sub-sub-resonator may support the sub-resonator 520, and may adjust for the distribution of the magnetic field formed within the source resonator 510 so that the magnetic field may be uniformly distributed. The sub-sub-resonator may be configured to compensate for the distribution of the magnetic field adjusted by the sub-resonator 520 so that the magnetic field may be more uniformly distributed in the source resonator 510.

The magnetic field distribution controller 530 may include at least one coil used to induce the magnetic field formed within the source resonator 510 to the center of the source resonator 510. The magnetic field distribution controller 530 may use the at least one coil to control the magnetic field formed within the source resonator 510 to be uniformly distributed.

The magnetic field distribution controller 530 may control the resonance frequency of the at least one coil so that current may flow in the at least one coil in the same direction as the current flowing in the source resonator 510.

For example, at least one coil may be located in the center of the source resonator 510, and may form at least one loop structure having different sizes. The magnetic field distribution controller 530 may more precisely control the magnetic field formed within the source resonator 510 using coils of various sizes.

In addition, at least one coil having the same shape may be located in a predetermined position within the source resonator 510. The at least one coil may be located in various areas within the source resonator 510. Under the control of the magnetic field distribution controller 530, the at least one coil may increase or decrease the strength of the magnetic field formed within the source resonator 510 in the various areas in which the at least one coil is located.

Moreover, the at least one coil may be located in the center of the source resonator 510, and may be configured to adjust the magnetic field formed within the source resonator 510. For example, the at least one coil may form a spiral-shaped structure. Although other shaped structures are possible, as disclosed herein.

The magnetic field distribution controller 530 may include one or more shielding layers. The shielding layers may have different sizes and/or heights based on the center of the source resonator 510, and may have the loop structure. Based on the shielding layers, the magnetic field distribution controller 530 may induce the magnetic field formed within the source resonator 510 to be uniformly distributed. The magnetic flux of the magnetic field formed within the source resonator 510 may be refracted from the shielding layers, and may be further concentrated on the center of the source resonator 510.

The magnetic field distribution controller 530 may include a layer formed of a mu negative (MNG) material, a double negative (DNG) material, or a magneto-dielectric material. The magnetic field distribution controller 530 may refract the magnetic flux of the magnetic field, based on the formed layer, and may induce the magnetic field to be uniformly distributed within the source resonator 510.

The magnetic field distribution controller 530 may be configured to adjust widths of the shielding layers laminated in predetermined positions of the source resonator 510 and the sub-resonator 520, and may induce the magnetic field to be uniformly distributed within the source resonator 510. Based on the widths of the shielding layers, a refractive level of the magnetic flux of the magnetic field may be changed. Accordingly, the magnetic field distribution controller 530 may control the magnetic field to be uniformly distributed within the source resonator 510, by adjusting the widths of the shielding layers.

A target device may be located on the source resonator 510 that is configured as a pad type resonator. In one or more embodiments, the gap between the source resonator 510 and the target device may be less than several centimeters (cm). Accordingly, a parasitic capacitance may be formed between the source resonator 510 and the target device. The parasitic capacitance may have an influence on the resonance frequency of the source resonator 510. The magnetic field distribution controller 530 may adjust widths and/or thicknesses of one or more the shielding layers laminated in predetermined positions of the source resonator 510 and the sub-resonator 520, and may offset a change in the resonance frequency of the source resonator 510 due to the parasitic capacitance formed between the source resonator 510 and the target device.

Figure 6A:
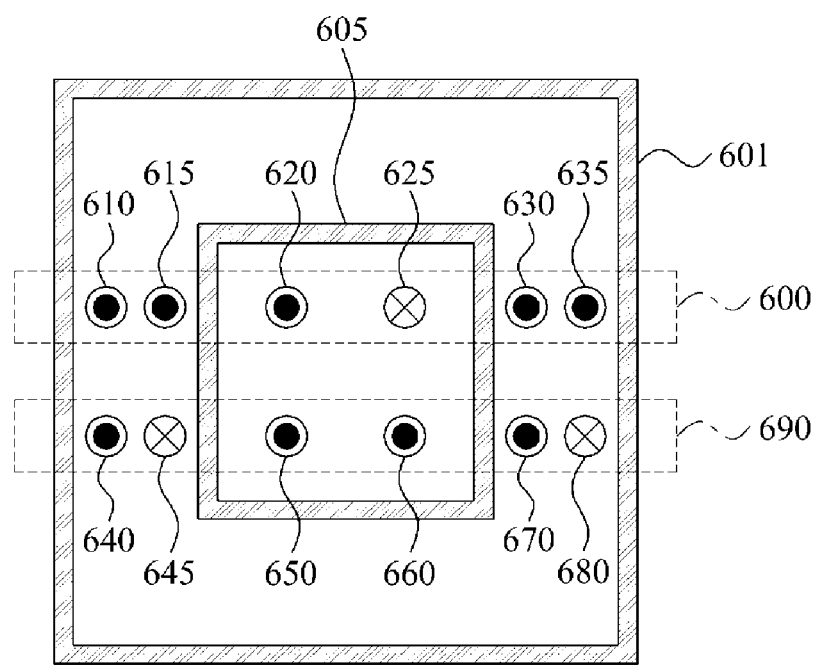
FIG. 6A is a diagram illustrating distribution of a magnetic field formed within a source resonator based on an operation of a magnetic field distribution controller in a wireless power transmitter.
Figure 6B:
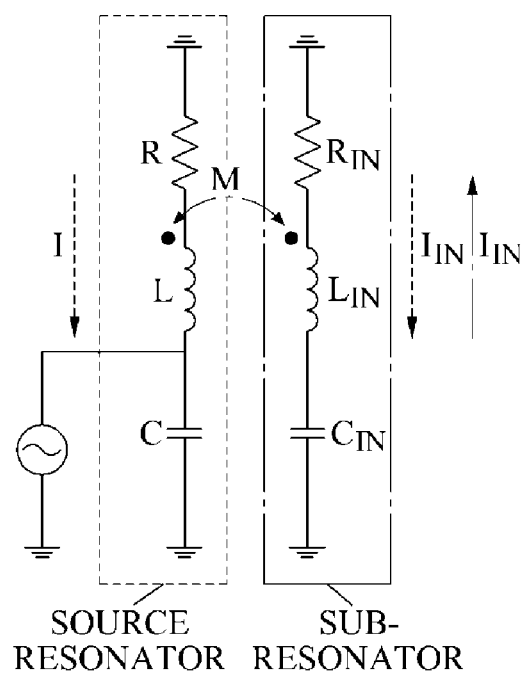
FIG. 6B is a diagram illustrating one equivalent circuit of a source resonator and one equivalent circuit of a sub-resonator.

FIG. 6A illustrates the distribution of a magnetic field formed within a source resonator 601, based on an operation of a magnetic field distribution controller in a wireless power transmitter. FIG. 6B illustrates one equivalent circuit of a source resonator 601, and one equivalent circuit of a sub-resonator 605.

The strength of the magnetic field formed within a sub-resonator 605, and the strength of a magnetic field formed between the sub-resonator 605 and the source resonator 601 may vary depending on the direction of current flowing in the source resonator 601, and a direction of a current flowing in the sub-resonator 605. The direction of the current flowing in the sub-resonator 605 may be determined based on the resonance frequency of the sub-resonator 605 and the resonance frequency of the source resonator 601. For example, the direction of the current flowing in the sub-resonator 605 may be determined based on a ratio of the resonance frequency of the sub-resonator 605 with respect to the resonance frequency of the source resonator 601. The magnetic field distribution controller may be configured to control the direction of the current flowing in the sub-resonator 605 by controlling the resonance frequency of the sub-resonator 605.

Directions of magnetic fields formed respectively by the source resonator 601 and the sub-resonator 605 may be determined based on the Fleming's right hand rule.

When the direction of the current flowing in the source resonator 601 is different from the direction of the current flowing in the sub-resonator 605, as indicated by a dotted box 600 in FIG. 6A, directions 610 and 635 of the magnetic field formed by the source resonator 601 may be the same as directions 615 and 630 of a magnetic field formed by the sub-resonator 605, in a region between the source resonator 601 and sub-resonator 605. Accordingly, in the region between the source resonator 601 and sub-resonator 605, the strength of the total magnetic field may increase. Within the sub-resonator 605, a direction 620 of the magnetic field formed by the source resonator 601 may be opposite to a direction 625 of the magnetic field formed by the sub-resonator 605. Accordingly, within the sub-resonator 605, the strength of the total magnetic field may decrease.

If the direction of the current flowing in the source resonator 601 is the same as the direction of the current flowing in the sub-resonator 605, as indicated by a dotted box 690 in FIG. 6A, directions 640 and 670 of the magnetic field formed by the source resonator 601 may be opposite to directions 645 and 680 of the magnetic field formed by the sub-resonator 605, in the region between the source resonator 601 and sub-resonator 605. Accordingly, in the region between the source resonator 601 and sub-resonator 605, the strength of the total magnetic field may decrease. Within the sub-resonator 605, a direction 650 of the magnetic field formed by the source resonator 601 may be the same as a direction 660 of the magnetic field formed by the sub-resonator 605. Accordingly, within the sub-resonator 605, the strength of the total magnetic field may increase.

As illustrated in FIGS. 2 through 4, the strength of the magnetic field formed within the source resonator 601 may not be constant. The magnetic field distribution controller may control the resonance frequency of the sub-resonator 605 so that the strength of the magnetic field formed within the source resonator 601 may be increased or reduced.

For example, in the resonators illustrated in FIGS. 2 and 3, the magnetic field distribution controller may control the direction of the current flowing in the source resonator 601 to be the same as the direction of the current flowing in the sub-resonator 605 so that the strength of the magnetic field corresponding to the center of the resonators may be increased, and that the strength of the magnetic field corresponding to the outer edges of each of the resonators may be reduced. Additionally, in the resonator illustrated in FIG. 4, the magnetic field distribution controller may control the direction of the current flowing in the source resonator 601 to be opposite to the direction of the current flowing in the sub-resonator 605, so that the strength of the magnetic field corresponding to the center of the resonator may be reduced, and that the strength of the magnetic field corresponding to the outer edges of the resonator may be increased. Accordingly, the magnetic field in the source resonator 601 may be randomly distributed. Also, the magnetic field distribution controller may increase or reduce the strength of the magnetic field in a predetermined area within the source resonator 601.

Referring to FIG. 6B, the source resonator 601 and the sub-resonator 605 may be each be represented by resistance-inductor-capacitor (RLC) resonant circuits. The resonance frequency for such circuits may be typically computed by Equation 1.

$$f_0 = \frac{1}{2\pi\sqrt{LC}} \quad \text{[Equation 1]}$$

Resistance may have no influence on determination of the resonance frequency and thus is not present in the Equation 1. Rather, the resistance $R_{IN}$ of the sub-resonator 605 may have influences on only a Q-value of the sub-resonator 605 and wireless power transmission efficiency, instead of the direction of the current flowing in the sub-resonator 605 and the resonance frequency of the sub-resonator 605. Accordingly, even if an equivalent circuit may be interpreted or determined based on a resistance set to "0," the resistance may have no effect on determination of the direction of the current flowing in the sub-resonator 605, and determination of the resonance frequency of the sub-resonator 605. For example, when current is supplied to the source resonator 601, a magnetic field may be formed, and the current may flow in the sub-resonator 605 through a mutual inductance M. A relationship in the sub-resonator 605 may be derived regardless of the resistance in the equivalent circuit, as given in Equation 2.

$$\left(j\omega L_{IN} + \frac{1}{j\omega C_{IN}}\right)I_{IN} + j\omega MI = 0 \quad \text{[Equation 2]}$$

In Equation 2, $L_{IN}$ and $C_{IN}$ denote the inductance and the capacitance of the sub-resonator 605, respectively. M denotes a mutual inductance between the source resonator 601 and the sub-resonator 605. Additionally, I denotes current flowing in the source resonator 601, and $I_{IN}$ denotes current flowing in the sub-resonator 605. The current $I_{IN}$ in Equation 2 may be computed by Equation 3.

$$I_{IN} = \frac{-j\omega\sqrt{LL_{IN}}\,\kappa}{j\omega L_{IN} + \frac{1}{j\omega C_{IN}}}I = \frac{\sqrt{LL_{IN}}\,\kappa}{\left(\frac{f_{IN0}}{f_0}\right)-1}I \quad \text{[Equation 3]}$$

$$\kappa = \frac{M}{\sqrt{LL_{IN}}} \quad \text{[Equation 4]}$$

For example, when the current I is greater than "0," the direction of the current $I_{IN}$ may be determined based on a ratio of a resonance frequency $f_{IN0}$ of the sub-resonator 605 with respect to the resonance frequency $f_0$ of the source resonator 601. And when the resonance frequency $f_{IN0}$ is greater than the resonance frequency $f_0$, the current $I_{IN}$ may flow in the same direction as the current I. Conversely, when the resonance frequency $f_{IN0}$ is less than the resonance frequency $f_0$, the current $I_{IN}$ may flow in a direction opposite to the current I.

In Equations 3 and 4, κ denotes a kappa value, and may be used to determine the wireless power transmission efficiency.

Since the current $I_{IN}$ may flow in the same direction as the current I when the resonance frequency $f_{IN0}$ is greater than the resonance frequency $f_0$, the strength of the magnetic field within the sub-resonator 605 may increase, but the strength of the magnetic field outside the sub-resonator 605 may decrease.

Since the current $I_{IN}$ may flow in the direction opposite to the current I when the resonance frequency $f_{IN0}$ is less than the resonance frequency $f_0$, the strength of the magnetic field within the sub-resonator 605 may decrease, but the strength of the magnetic field outside the sub-resonator 605 may increase.

When the resonance frequency $f_{IN0}$ is substantially equal to the resonance frequency $f_0$, the magnetic field may be concentrated on the center of the sub-resonator 605.

The magnetic field distribution controller may control the resonance frequency $f_{IN0}$, and may control the strength of the magnetic field within the source resonator 601. The resonance frequency $f_{IN0}$ may be determined based on the inductance and the capacitance of the sub-resonator 605. Additionally, the inductance and/or the capacitance of the sub-resonator 605 may be determined based on the size and/or the shape of the sub-resonator 605. The magnetic field distribution controller may control the capacitance of a capacitor included in the sub-resonator 605, and/or may control the inductance by adjusting the length and/or the width of a transmission line that forms the sub-resonator 605.

Figure 7:
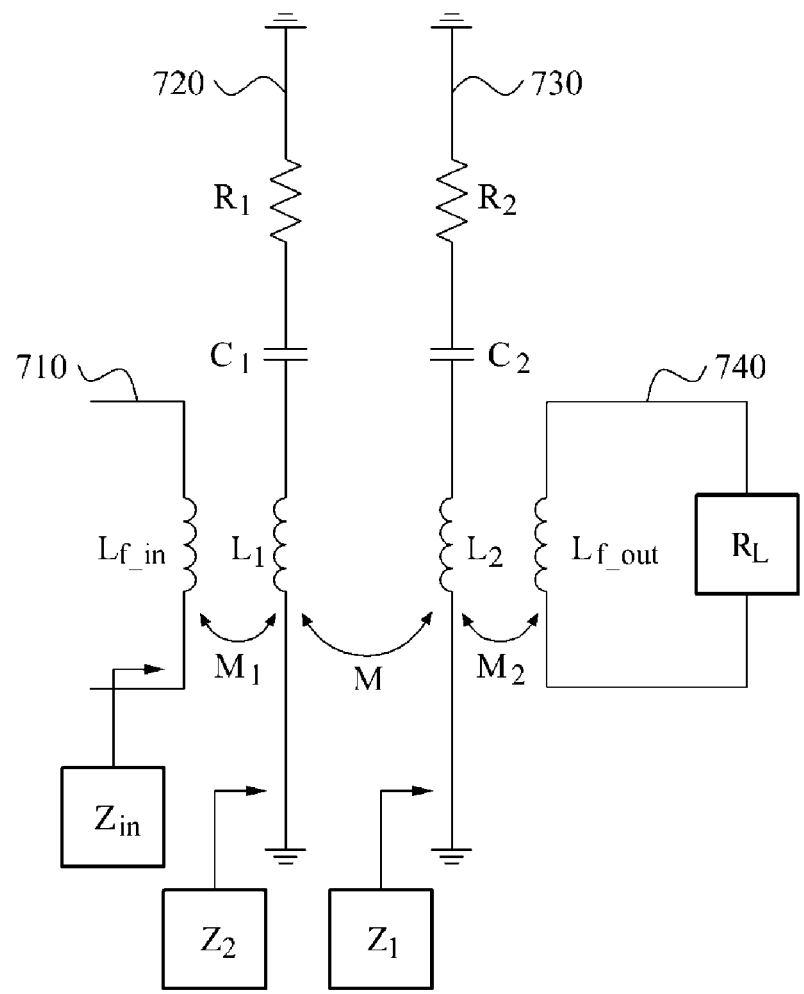
FIG. 7 is a diagram illustrating one equivalent circuit of a wireless power transmission and reception system.

FIG. 7 illustrates an equivalent circuit of a wireless power transmission and reception system.

Referring to FIG. 7, the wireless power transmission and reception system includes a feeder 710, a source resonator 720, a target resonator 730, and a feeder/load 740. The feeder 710 may induce current to the source resonator 720 so that a magnetic field may be formed in a source device. The source resonator 720 may wirelessly transmit power to the target resonator 730 through magnetic coupling. The target resonator 730, and the feeder/load 740 may be included in a target device, and the feeder/load 740 may receive power transferred from the target resonator 730.

For example, when the magnetic field formed within the source resonator 720 is uniformly distributed under the control of the magnetic field distribution controller, a mutual inductance M between the source resonator 720 and the target resonator 730 may have a constant value. An input impedance $Z_{in}$ viewed in a direction from the source resonator 720 to the target device may be computed by Equation 5.

$$Z_{in} = \frac{(\omega M_1)^2\{(\omega M_2)^2 + R_2 R_L\}}{R_L(\omega M_1)^2 + R_1(\omega M_2)^2 + R_1 R_2 R_L}$$ [Equation 5]

In Equation 5, a resistance $R_1$ of the source resonator 720, a resistance $R_2$ of the target resonator 730, and an impedance $R_L$ of a load 740 may have fixed values. Additionally, $M_1$ denotes a mutual inductance between the feeder 710 and the source resonator 720, and $M_2$ denotes a mutual inductance between the feeder/load 740 and the target resonator 730. For example, when a position of the feeder 710 and a position of the feeder/load 740 are fixed, $M_1$ and $M_2$ may have constant values. Accordingly, the input impedance $Z_{in}$ may be determined or computed using the fixed values, and thus the input impedance $Z_{in}$ may also have a constant value. Additionally, the magnetic field distribution controller may control the input impedance $Z_{in}$ by changing a value of the mutual inductance M.

When the input impedance $Z_{in}$ has a constant value, impedance matching between the source resonator 720 and the target resonator 730 may be easily performed. Additionally, the target device in which impedance matching is performed may efficiently receive wireless power by changing a Q-value and κ-value. Additionally, Q-values and κ-values may be adjusted between multiple target devices so that received power may be automatically distributed.

Figure 8:
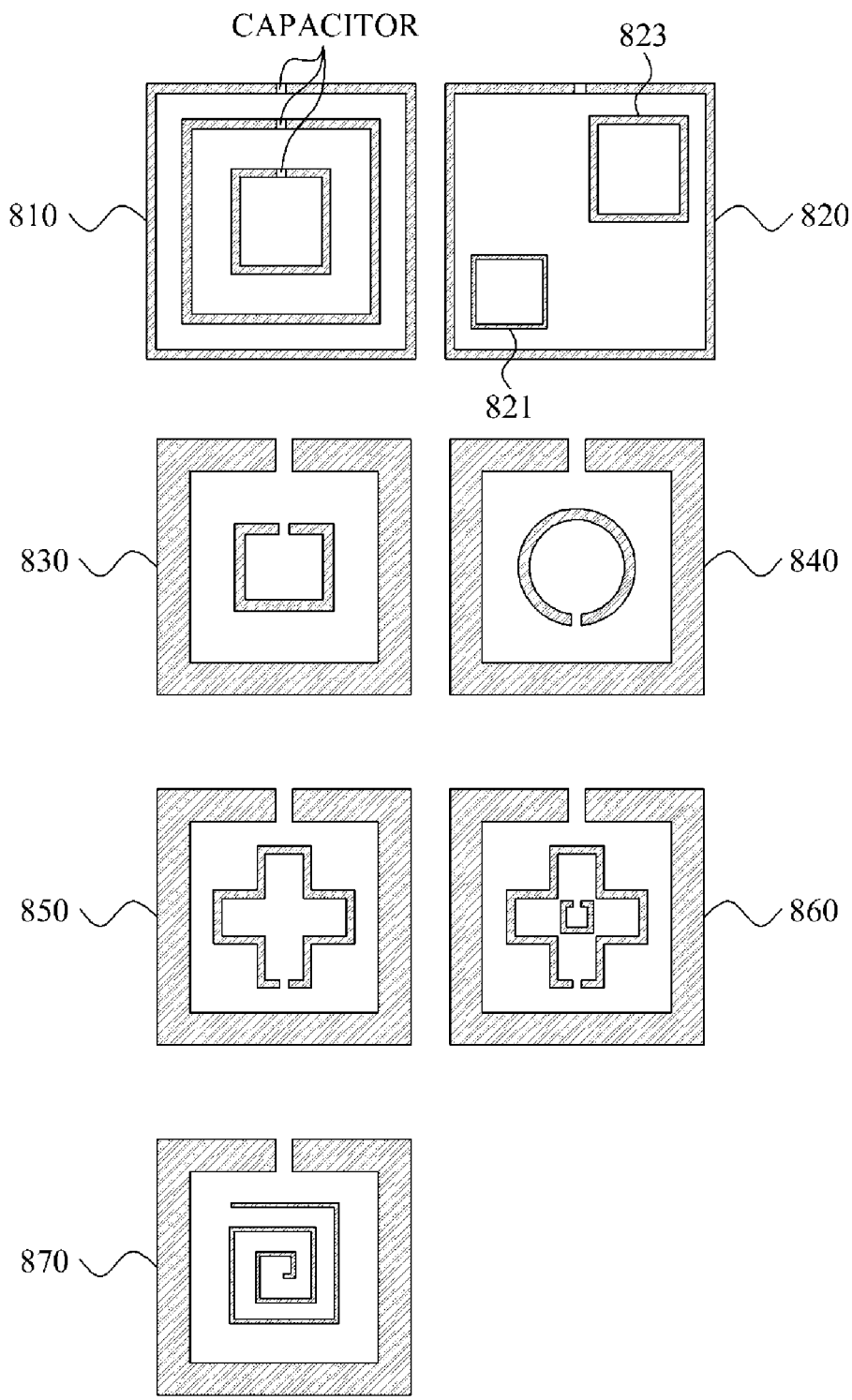
FIG. 8 is a diagram illustrating various sub-resonator structures.

FIG. 8 illustrates various sub-resonator structures for use in a source resonator.

Referring to FIG. 8, a source resonator 810 may be configured as a loop and includes a capacitor. The source resonator 810 may further include a sub-resonator and a sub-sub-resonator that are located within the source resonator 810. As the number of sub-resonators increases, the magnetic field formed within the source resonator may be more precisely controlled. Additionally, the magnetic field formed within the source resonator may be more uniformly distributed.

As illustrated in FIG. 8, a source resonator 820 includes sub-resonators 821 and 823 that are located within the source resonator 820. A magnetic field distribution controller may enable currents to respectively flow in different directions in the sub-resonators 821 and 823. For example, the magnetic field distribution controller may enable the direction of current flowing in the source resonator 820 to be the same as the direction of current flowing in the sub-resonator 821, and to be opposite to the direction of current flowing in the sub-resonator 823. The strength of a magnetic field formed within the sub-resonator 821 may increase, but the strength of a magnetic field formed within the sub-resonator 823 may decrease.

Additionally, a source resonator 830 of FIG. 8 includes a sub-resonator having a loop shape. A source resonator 840 of FIG. 8 includes a sub-resonator having a circular-shaped structure, and a source resonator 850 of FIG. 8 includes a sub-resonator having a cross-shaped structure. In addition, a source resonator 860 of FIG. 8 includes a sub-resonator having a cross-shape structure, and a sub-sub-resonator that has a loop structure and that is located in the sub-resonator. A source resonator 870 of FIG. 8 includes a sub-resonator having a spiral-shaped structure. The sub-resonator may be implemented in various shapes and structures.

Figure 9:
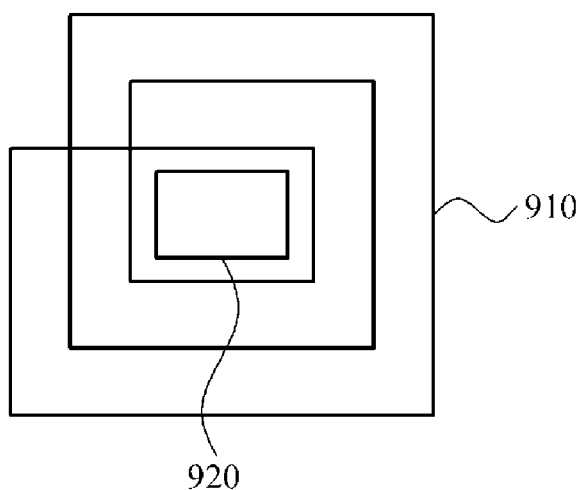
FIG. 9 is a diagram illustrating a spiral resonator in a wireless power transmitter.

FIG. 9 illustrates a spiral resonator in a wireless power transmitter.

Referring to FIG. 9, a source resonator 910 has a rectangular spiral structure. The source resonator 910 includes a sub-resonator 920 located in the source resonator 910. A magnetic field distribution controller may control the direction of current flowing in the sub-resonator 920 and a direction of current flowing in the source resonator 910, and may control distribution of a magnetic field formed within the source resonator 910. The source resonator 910 may be configured, for example, as a helix structured resonator, a spiral structured resonator, a meta-structured resonator, and the like. Additionally, the sub-resonator 920 may have various structures, for example, as illustrated in FIG. 8.

Figure 10:
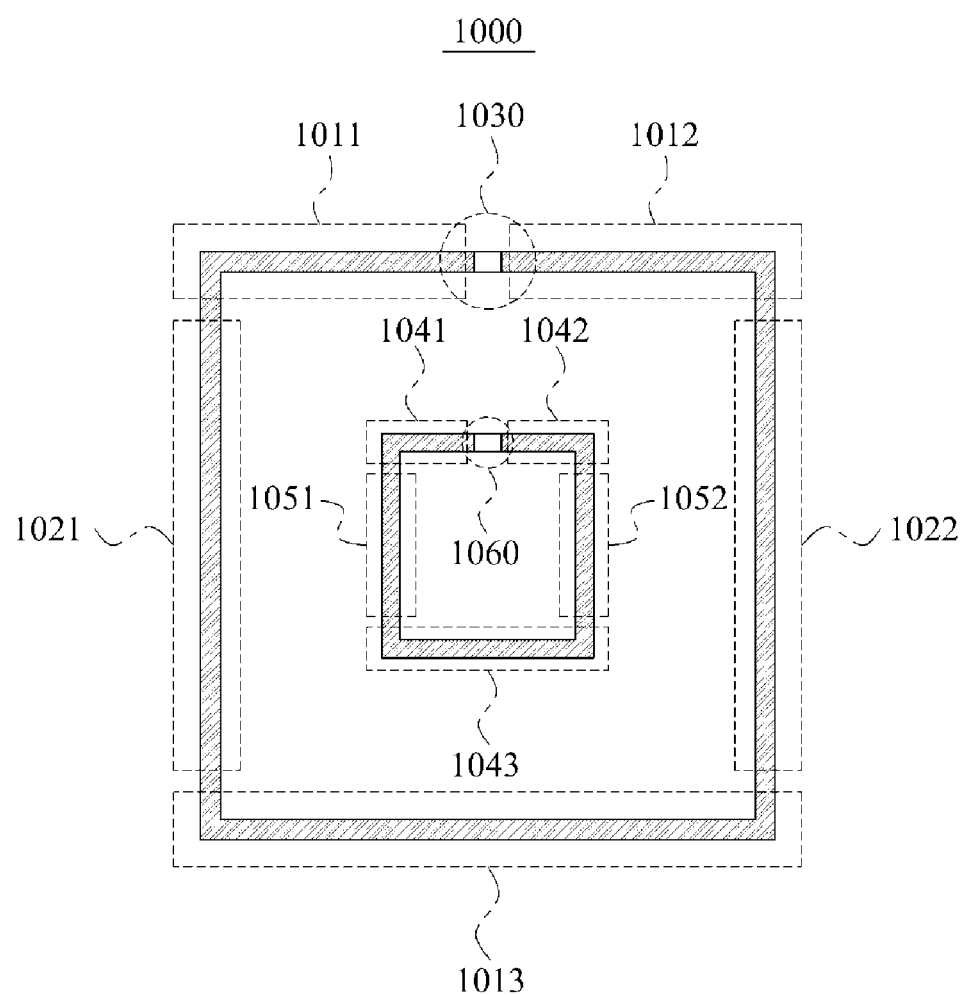
FIG. 10 is a diagram illustrating a wireless power transmitter.

FIG. 10 illustrates a wireless power transmitter 1000.

In various implementations, a source resonator may form a magnetic coupling with a target resonator. For instance, the source resonator may be configured to wirelessly transmit a power to a target device through the magnetic coupling. As illustrated in FIG. 10, the source resonator includes a first transmission line, a first conductor 1021, a second conductor 1022, and at least one first capacitor 1030.

The first capacitor 1030 may be inserted or otherwise positioned in series between a first signal conducting portion 1011 and a second signal conducting portion 1012 in the first transmission line, and an electric field may be confined within the first capacitor 1030. For example, the first transmission line may include at least one conductor in an upper portion of the first transmission line, and may also include at least one conductor in a lower portion of the first transmission line. Current may flow through the at least one conductor disposed in the upper portion of the first transmission line, and the at least one conductor disposed in the lower portion of the first transmission line may be electrically grounded. For example, a conductor disposed in an upper portion of the first transmission line may be separated into multiple portions, such as the first signal conducting portion 1011 and the second signal conducting portion 1012. A conductor disposed in a lower portion of the first transmission line may be a first ground conducting portion 1013.

The source resonator of FIG. 10 may have a generally two-dimensional (2D) structure. The first transmission line may include the first signal conducting portion 1011 and the second signal conducting portion 1012 in the upper portion of the first transmission line. In addition, the first transmission line may include the first ground conducting portion 1013 in the lower portion of the first transmission line. As shown, the first signal conducting portion 1011 and the second signal conducting portion 1012 may be disposed to face the first ground conducting portion 1013 with current flowing through the first signal conducting portion 1011 and the second signal conducting portion 1012.

Additionally, one end of the first signal conducting portion 1011 may be electrically connected (i.e., shorted) to the first conductor 1021, and another end of the first signal conducting portion 1011 may be connected to the first capacitor 1030. One end of the second signal conducting portion 1012 may be electrically connected (i.e., shorted) to the second conductor 1022, and another end of the second signal conducting portion 1012 may be connected to the first capacitor 1030. Accordingly, the first signal conducting portion 1011, the second signal conducting portion 1012, the first ground conducting portion 1013, and the conductors 1021 and 1022 may be connected to one another, so that the source resonator may have an electrically closed-loop structure. The term "closed-loop structure" as used herein, may include a polygonal structure, for example, a circular structure, a rectangular structure, or the like that is a circuit that is electrically closed.

The first capacitor 1030 may be inserted into an intermediate portion of the first transmission line. For example, the first capacitor 1030 may be inserted into a space between the first signal conducting portion 1011 and the second signal conducting portion 1012. The first capacitor 1030 may be configured, in some instance, as a lumped element, a distributed element, and the like. For example, a capacitor configured as a distributed element and may include zigzagged conductor lines and a dielectric material that has a high permittivity between the zigzagged conductor lines.

When the first capacitor 1030 is inserted into the first transmission line, the source resonator may have a characteristic of a metamaterial. The metamaterial indicates a material having a predetermined electrical property that has not been discovered in nature, and thus, may have an artificially (i.e., man-made) designed structure. An electromagnetic characteristic of the materials existing in nature may have a unique magnetic permeability or a unique permittivity. Most materials may have a positive magnetic permeability or a positive permittivity.

In the case of most materials, a right hand rule may be applied to an electric field, a magnetic field, and a pointing vector, and thus, the corresponding materials may be referred to as right handed materials (RHMs). However, the metamaterial that has a magnetic permeability or a permittivity absent in nature may be classified into an epsilon negative (ENG) material, an MNG material, a DNG material, a negative refractive index (NRI) material, a left-handed (LH) material, and the like, based on a sign of the corresponding permittivity or magnetic permeability.

When a capacitance of the first capacitor 1030 inserted as the lumped element is appropriately determined, the source resonator may have the characteristic of the metamaterial. Because the source resonator may have a negative magnetic permeability by appropriately adjusting the capacitance of the first capacitor 1030, the source resonator may also be referred to as an MNG resonator. Various criteria may be applied to determine the capacitance of the first capacitor 1030. For example, the various criteria may include a criterion for enabling the source resonator to have the characteristic of the metamaterial, a criterion for enabling the source resonator to have a negative magnetic permeability in a target frequency, a criterion for enabling the source resonator to have a zeroth order resonance characteristic in the target frequency, and the like. Based on at least one criterion among the aforementioned criteria, the capacitance of the first capacitor 1030 may be determined.

The source resonator, also referred to as the MNG resonator, may have also a zeroth order resonance characteristic (i.e., having, as a resonance frequency, a frequency when a propagation constant is "0"). If the source resonator has a zeroth order resonance characteristic, the resonance frequency may be independent with respect to a physical size of the MNG resonator. Moreover, by appropriately designing or configuring the first capacitor 1030, the MNG resonator may sufficiently change the resonance frequency without significantly changing the physical size of the MNG resonator.

In a near field, for instance, the electric field may be concentrated on the first capacitor 1030 inserted into the first transmission line. Accordingly, due to the first capacitor 1030, the magnetic field may become dominant in the near field. In one or more embodiments, the MNG resonator may have a relatively high Q-factor using the first capacitor 1030 of the lumped element. Thus, it may be possible to enhance an efficiency of power transmission. For example, the Q-factor may indicate a level of an ohmic loss or a ratio of a reactance with respect to a resistance in the wireless power transmission. The efficiency of the wireless power transmission may increase according to an increase in the Q-factor.

In one or more embodiments, a magnetic core may be further provided to pass through the MNG resonator. The magnetic core may increase the power transmission distance.

Referring to FIG. 10, a sub-resonator includes a second transmission line, a third conductor 1051, a fourth conductor 1052, and at least one second capacitor 1060.

The second capacitor 1060 may be inserted or otherwise positioned in series between a third signal conducting portion 1041 and a fourth signal conducting portion 1042 in the second transmission line, and an electric field may be confined within the second capacitor 1060.

As illustrated in FIG. 10, the sub-resonator may have a generally 2D structure. The second transmission line may include the third signal conducting portion 1041 and the fourth signal conducting portion 1042 in an upper portion of the second transmission line. In addition, the second transmission line may include a second ground conducting portion 1043 in a lower portion of the second transmission line. The third signal conducting portion 1041 and the fourth signal conducting portion 1042 may be disposed to face the second ground conducting portion 1043. Current may flow through the third signal conducting portion 1041 and the fourth signal conducting portion 1042.

Additionally, one end of the third signal conducting portion 1041 may be electrically connected (i.e., shorted) to the third conductor 1051, and another end of the third signal conducting portion 1041 may be connected to the second capacitor 1060. And one end of the fourth signal conducting portion 1042 may be shorted to the fourth conductor 1052, and another end of the fourth signal conducting portion 1042 may be connected to the second capacitor 1060. Accordingly, the third signal conducting portion 1041, the fourth signal conducting portion 1042, the second ground conducting portion 1043, the third conductor 1051, and the fourth conductor 1052 may be connected to one another such that the sub-resonator may have an electrically closed-loop structure. The second transmission line, the third conductor 1051, and the fourth conductor 1052 may form, for example, a rectangular loop structure, a circular loop structure, or a cross-shaped loop structure.

A magnetic field distribution controller may adjust a resonance frequency of at least one sub-resonator, based on a value of the second capacitor 1060, and the length and/or width of the second transmission line, so that the resonance frequency of the sub-resonator may be different from the resonance frequency of the source resonator (e.g., by a predetermined value).

The magnetic field distribution controller may adjust the value of the second capacitor 1060. For example, when the value of the second capacitor 1060 is changed, the resonance frequency of the sub-resonator may also be changed. Accordingly, the magnetic field distribution controller may adjust the resonance frequency of the sub-resonator to be greater or less than the resonance frequency of the source resonator, by adjusting the value of the second capacitor 1060. The magnetic field distribution controller may adjust the resonance frequency of the sub-resonator to be greater or less than the resonance frequency of the source resonator so that the magnetic field in the center of the source resonator may have the same strength as the magnetic field in outer edges the source resonator.

FIGS. 11 through 15 illustrate various resonator structures. A source resonator included in a wireless power transmitter may be configured, for example, as illustrated in FIGS. 11 through 15.

Figure 11:
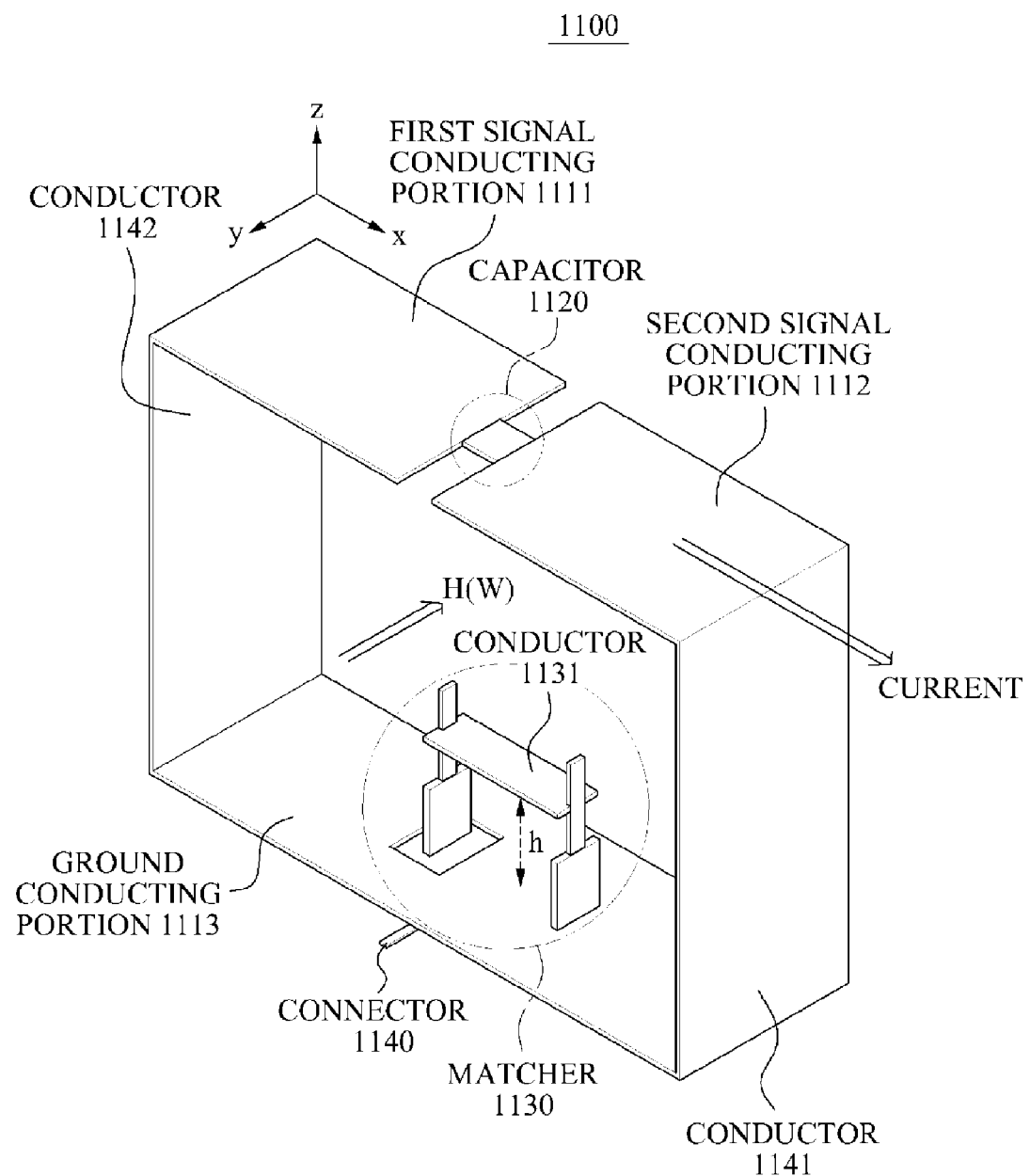
FIGS. 11 through 15 are diagrams illustrating various resonator structures.

FIG. 11 illustrates a resonator 1100 having a three-dimensional (3D) structure.

Referring to FIG. 11, a resonator 1100 may include a transmission line and a capacitor 1120. The transmission line may include a first signal conducting portion 1111, a second signal conducting portion 1112, and a ground conducting portion 1113. The capacitor 1120 may be inserted, for instance, in series between the first signal conducting portion 1111 and the second signal conducting portion 1112 of the transmission line such that an electric field may be confined within the capacitor 1120.

As illustrated in FIG. 11, the resonator 1100 may have a generally 3D structure. The transmission line may include the first signal conducting portion 1111 and the second signal conducting portion 1112 in an upper portion of the resonator 1100, and may include the ground conducting portion 1113 in a lower portion of the resonator 1100. The first signal conducting portion 1111 and the second signal conducting portion 1112 may be disposed to face the ground conducting portion 1113. In this arrangement, current may flow in an x direction through the first signal conducting portion 1111 and the second signal conducting portion 1112. Due to the current, a magnetic field H(W) may be formed in a −y direction. Alternatively, the magnetic field H(W) might be formed in an opposite direction (e.g., the +y direction) in other implementations.

In one or more embodiments, one end of the first signal conducting portion 1111 may be electrically connected (i.e., shorted) to a conductor 1142, and another end of the first signal conducting portion 1111 may be connected to the capacitor 1120. One end of the second signal conducting portion 1112 may be grounded to a conductor 1141, and another end of the second signal conducting portion 1112 may be connected to the capacitor 1120. Accordingly, the first signal conducting portion 1111, the second signal conducting portion 1112, the ground conducting portion 1113, and the conductors 1141 and 1142 may be connected to each other, whereby the resonator 1100 may have an electrically closed-loop structure.

As illustrated in FIG. 11, the capacitor 1120 may be inserted or otherwise positioned between the first signal conducting portion 1111 and the second signal conducting portion 1112. The capacitor 1120 may include, for example, a lumped element, a distributed element, and the like. For example, a distributed capacitor having the shape of the distributed element may include zigzagged conductor lines and a dielectric material having a relatively high permittivity positioned between the zigzagged conductor lines.

When the capacitor 1120 is inserted into the transmission line, the resonator 1100 may have a characteristic of a metamaterial, in some instance, as discussed above.

For example, when the capacitance of the capacitor inserted as the lumped element is appropriately determined or configured, the resonator 1100 may have the characteristic of the metamaterial. Since the resonator 1100 may have a negative magnetic permeability by appropriately adjusting the capacitance of the capacitor 1120, the resonator 1100 may also be referred to as an MNG resonator. Various criteria may be applied to determine the capacitance of the capacitor 1120. For example, the various criteria may include a criterion to enable the resonator 1100 to have the characteristic of the metamaterial, a criterion to enable the resonator 1100 to have a negative magnetic permeability in a target frequency, a criterion to enable the resonator 1100 to have a zeroth order resonance characteristic in the target frequency, or the like. Based on at least one criterion among the aforementioned criteria, the capacitance of the capacitor 1120 may be determined.

The resonator 1100, also referred to as the MNG resonator 1100, may have a zeroth order resonance characteristic (i.e., having, as a resonance frequency, a frequency when a propagation constant is "0"). If the resonator 1100 has a zeroth order resonance characteristic, the resonance frequency may be independent with respect to a physical size of the MNG resonator 1100. Thus, by appropriately designing or configuring the capacitor 1120, the MNG resonator 1100 may sufficiently change the resonance frequency without significantly changing the physical size of the MNG resonator 1100.

Referring to the MNG resonator 1100 of FIG. 11, in a near field, the electric field may be concentrated on the capacitor 1120 inserted into the transmission line. Accordingly, due to the capacitor 1120, the magnetic field may become dominant in the near field. And since the MNG resonator 1100 having the zeroth-order resonance characteristic may have characteristics similar to a magnetic dipole, the magnetic field may become dominant in the near field. A relatively small amount of the electric field formed due to the insertion of the capacitor 1120 may be concentrated on the capacitor 1120 and thus, the magnetic field may become further dominant. The MNG resonator 1100 may have a relatively high Q-factor using the capacitor 1120 of the lumped element and thus, it may be possible to enhance an efficiency of power transmission.

In one or more embodiments, the MNG resonator 1100 may include a matcher 1130 to be used in impedance matching. The matcher 1130 may be configured to appropriately adjust the strength of the magnetic field of the MNG resonator 1100. The impedance of the MNG resonator 1100 may be determined by the matcher 1130. Current may flow into and/or out of the MNG resonator 1100 via a connector 1140. And the connector 1140 may be connected to the ground conducting portion 1113 or the matcher 1130.

As illustrated in FIG. 11, the matcher 1130 may be positioned within the loop formed by the loop structure of the resonator 1100. The matcher 1130 may be configured to adjust the impedance of the resonator 1100 by changing the physical shape of the matcher 1130. For example, the matcher 1130 may include a conductor 1131 to be used in the impedance matching in a location separate from the ground conducting portion 1113 by a distance h. The impedance of the resonator 1100 may be changed by adjusting the distance h.

In some embodiments, a controller may be provided to control the matcher 1130. The matcher 1130 may change the physical shape of the matcher 1130 based on a control signal generated by the controller. For example, the distance h between the conductor 1131 of the matcher 1130 and the ground conducting portion 1113 may be increased or decreased based on the control signal. Accordingly, the physical shape of the matcher 1130 may be changed such that the impedance of the resonator 1100 may be adjusted. The distance h between the conductor 1131 of the matcher 1130 and the ground conducting portion 1113 may be adjusted using a variety of schemes. In one embodiment, one or more conductors may be included in the matcher 1130 and the distance h may be adjusted by adaptively activating one of the conductors. Alternatively or additionally, the distance h may be adjusted by adjusting the physical location of the conductor 1131 up and down. For instance, the distance h may be controlled based on the control signal of the controller. The controller may generate the control signal using various factors.

As illustrated in FIG. 11, the matcher 1130 may be configured as a passive element such as the conductor 1131, for instance. According to various embodiments, the matcher 1130 may be configured as an active element such as a diode, a transistor, or the like. If an active element is included in the matcher 1130, the active element may be driven based on the control signal generated by the controller, and the impedance of the resonator 1100 may be adjusted based on the control signal. For example, if the active element is a diode included in the matcher 1130, the impedance of the resonator 1100 may be adjusted depending on whether the diode is in an ON state or in an OFF state.

In various embodiments, a magnetic core may be further provided to pass through the resonator 1100 configured as the MNG resonator 1100. The magnetic core may increase the power transmission distance.

Figure 12:
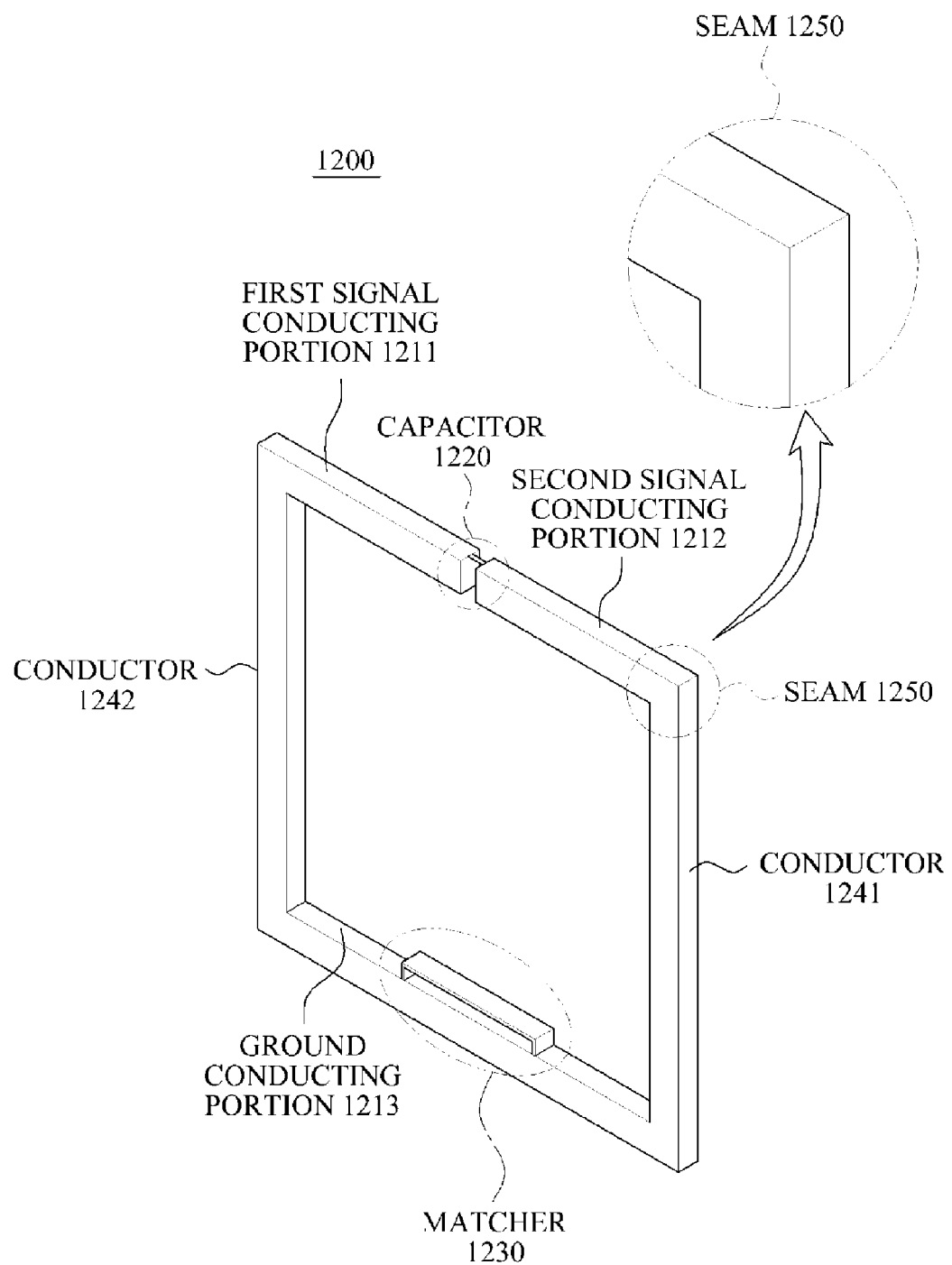

FIG. 12 illustrates a resonator 1200 for wireless power transmission, configured as a bulky type. As used herein, the term "bulky type" may refer to a seamless connection connecting at least two parts in an integrated form.

Referring to FIG. 12, a first signal conducting portion 1211 and a conductor 1242 may be integrally formed, rather than being separately manufactured and being connected to each other. Similarly, a second signal conducting portion 1212 and a conductor 1241 may also be integrally manufactured.

When the second signal conducting portion 1212 and the conductor 1241 are separately manufactured and then are connected to each other, a loss of conduction may occur due to a seam 1250. The second signal conducting portion 1212 and the conductor 1241 may be connected to each other without using a separate seam, that is, may be seamlessly connected to each other. Additionally, the conductor 1241 and a ground conducting portion 1213 may be seamlessly connected to each other. Accordingly, it may be possible to decrease a conductor loss caused by the seam 1250. Also, the second signal conducting portion 1212 and the ground conducting portion 1213 may be seamlessly and integrally manufactured. Similarly, the first signal conducting portion 1211 and the ground conducting portion 1213 may be seamlessly and integrally manufactured.

Figure 13:
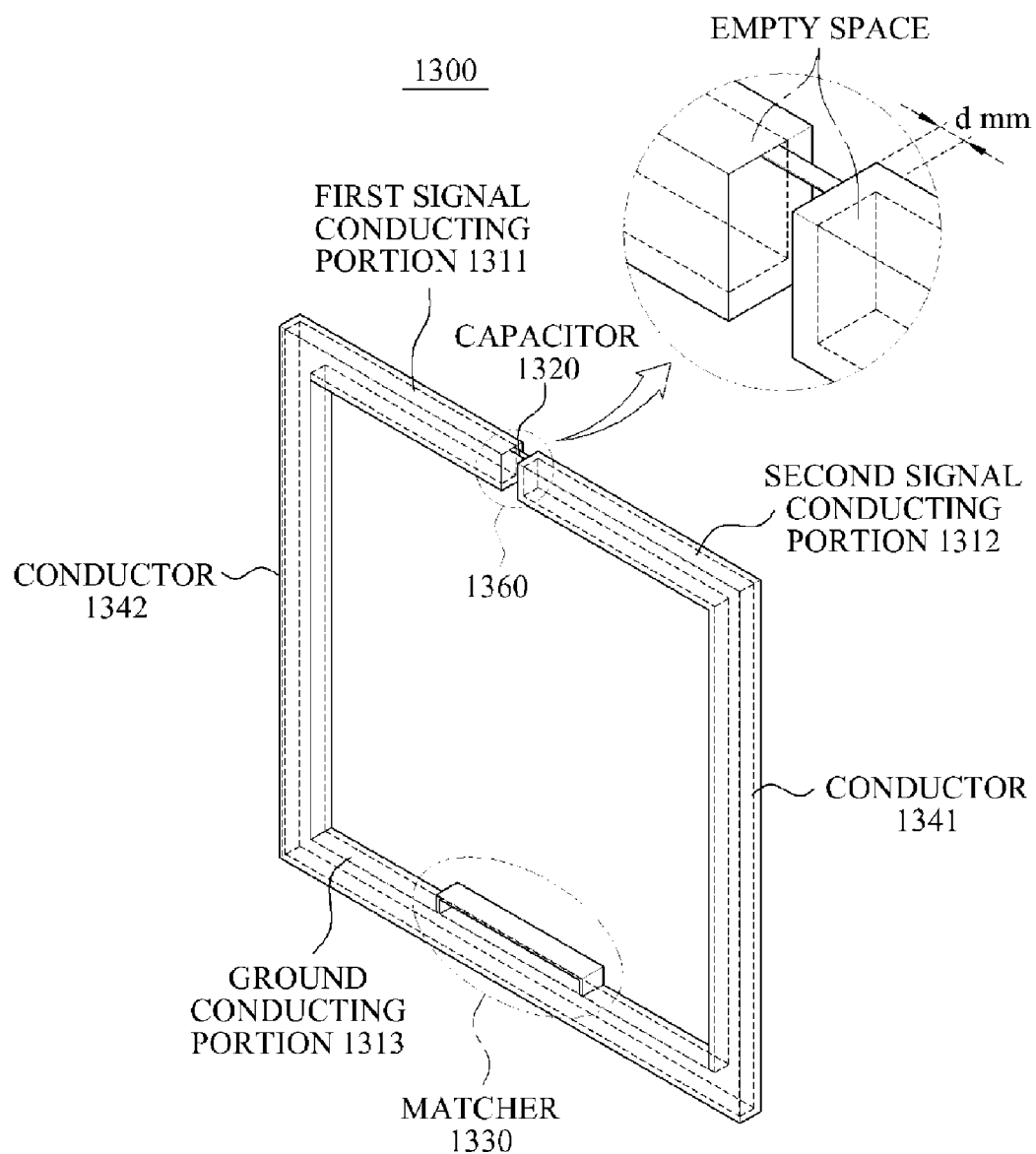

FIG. 13 illustrates a resonator 1300 for wireless power transmission configured as a hollow type.

Referring to FIG. 13, one or more of a first signal conducting portion 1311, a second signal conducting portion 1312, a ground conducting portion 1313, and conductors 1341 and 1342 of the resonator 1300 configured as the hollow type structure. As used herein the term "hollow type" refers to a configuration that may include an empty space inside.

For a given resonance frequency, active current may be modeled to flow in only a portion of the first signal conducting portion 1311 instead of the entire first signal conducting portion 1311, a portion of the second signal conducting portion 1312 instead of the entire second signal conducting portion 1312, a portion of the ground conducting portion 1313 instead of the entire ground conducting portion 1313, and/or a portion of the conductors 1341 and 1342 instead of the entire conductors 1341 and 1342. For example, when the depth of one or more of the first signal conducting portion 1311, the second signal conducting portion 1312, the ground conducting portion 1313, and the conductors 1341 and 1342 is significantly deeper than a corresponding skin depth in the given resonance frequency, it may be ineffective. As a result, the significantly deeper depth may increase the weight and/or manufacturing costs of the resonator 1300.

Accordingly, for the given resonance frequency, the depth of one or more of the first signal conducting portion 1311, the second signal conducting portion 1312, the ground conducting portion 1313, and the conductors 1341 and 1342 may be appropriately determined based on the corresponding skin depth of each of the first signal conducting portion 1311, the second signal conducting portion 1312, the ground conducting portion 1313, and the conductors 1341 and 1342. When one or more of the first signal conducting portion 1311, the second signal conducting portion 1312, the ground conducting portion 1313, and the conductors 1341 and 1342 have an appropriate depth deeper than a corresponding skin depth, the resonator 1300 may be manufactured to be lighter in weight, and manufacturing costs of the resonator 1300 may also decrease.

For example, as illustrated in FIG. 13, the depth of the second signal conducting portion 1312 (as further illustrated in the enlarged view region 1360 indicated by a circle) may be determined as "d" mm, and d may be determined according to $$d = \frac{1}{\sqrt{\pi f \mu \sigma}}.$$

Here, f denotes a frequency, μ denotes a magnetic permeability, σ and denotes a conductor constant. For example, when the first signal conducting portion 1311, the second signal conducting portion 1312, the ground conducting portion 1313, and the conductors 1341 and 1342 are made of a copper and have a conductivity of $5.8 \times 10^7$ siemens per meter (S·m$^{-1}$), the skin depth may be about 0.6 mm with respect to 10 kHz of the resonance frequency, and the skin depth may be about 0.006 mm with respect to 100 MHz of the resonance frequency.

A capacitor 1320 and a matcher 1330 may be provided that are similarly constructed as described herein in one or more embodiments.

Figure 14:
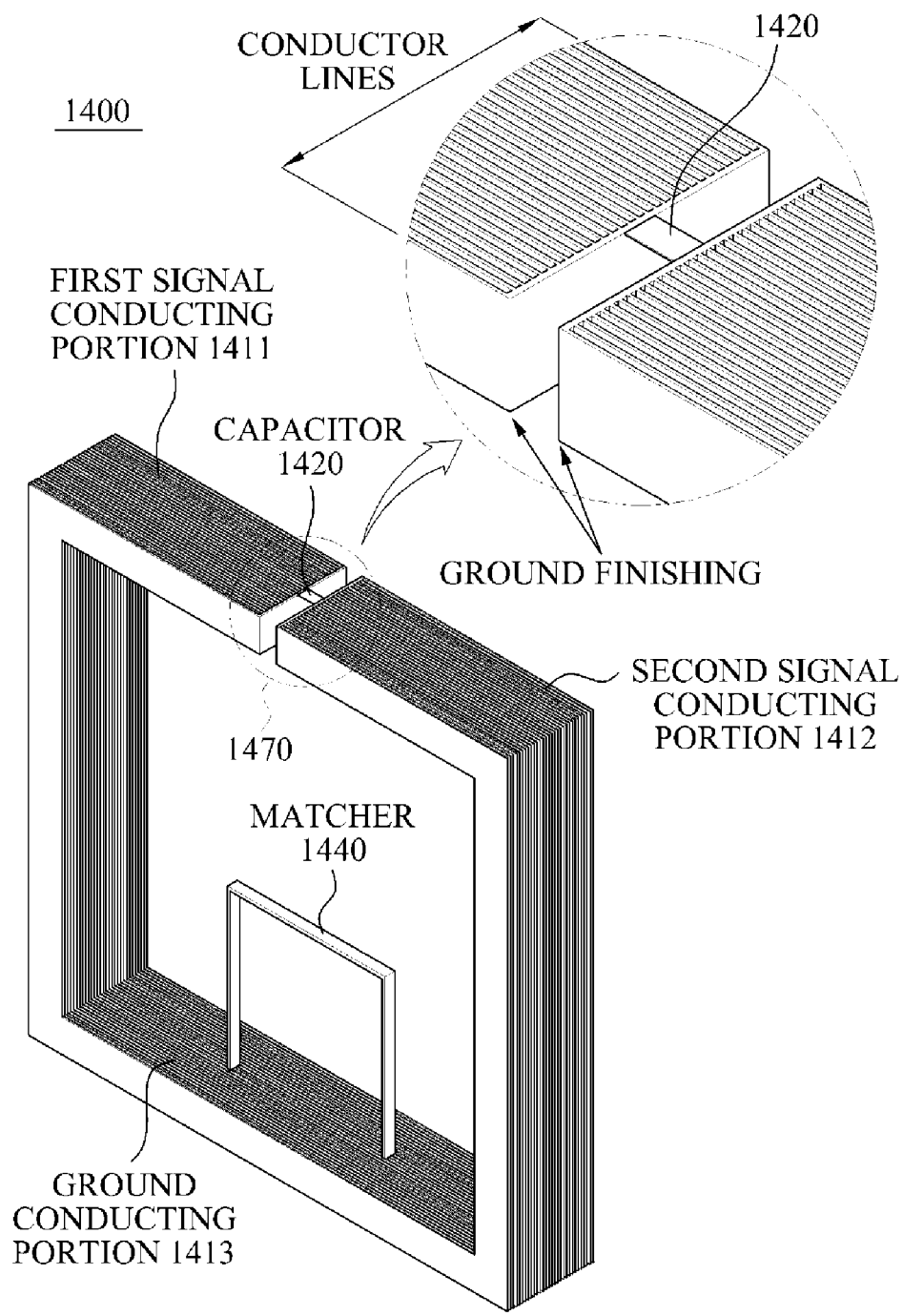

FIG. 14 illustrates a resonator 1400 for wireless power transmission using a parallel-sheet configuration.

Referring to FIG. 14, the parallel-sheet configuration may be applicable to a first signal conducting portion 1411 and a second signal conducting portion 1412 included in the resonator 1400.

The first signal conducting portion 1411 and/or the second signal conducting portion 1412 may not be perfect conductors, and thus may have an inherent resistance. Due to this resistance, an ohmic loss may occur. The ohmic loss may decrease a Q-factor and may also decrease a coupling effect.

By applying the parallel-sheet configuration to each of the first signal conducting portion 1411 and the second signal conducting portion 1412, it may be possible to decrease the ohmic loss, and to increase the Q-factor and the coupling effect. Referring to the enlarged view portion 1470 (indicated by a circle) in FIG. 14, when the parallel-sheet configuration is applied, one or both of the first signal conducting portion 1411 and the second signal conducting portion 1412 may include one or more conductor lines. The conductor lines may be disposed in parallel, and may be electrically connected (i.e., shorted) at an end portion of each of the first signal conducting portion 1411 and the second signal conducting portion 1412.

As described above, when the parallel-sheet configuration is applied to one or both of the first signal conducting portion 1411 and the second signal conducting portion 1412, the conductor lines may be disposed in parallel. Accordingly, the sum of resistances of the conductor lines may decrease. Consequently, the resistance loss may decrease, and the Q-factor and the coupling effect may increase.

A capacitor 1420 and a matcher 1430 positioned on the ground conducting portion 1413 may be provided that are similarly constructed as described herein in one or more embodiments.

Figure 15:
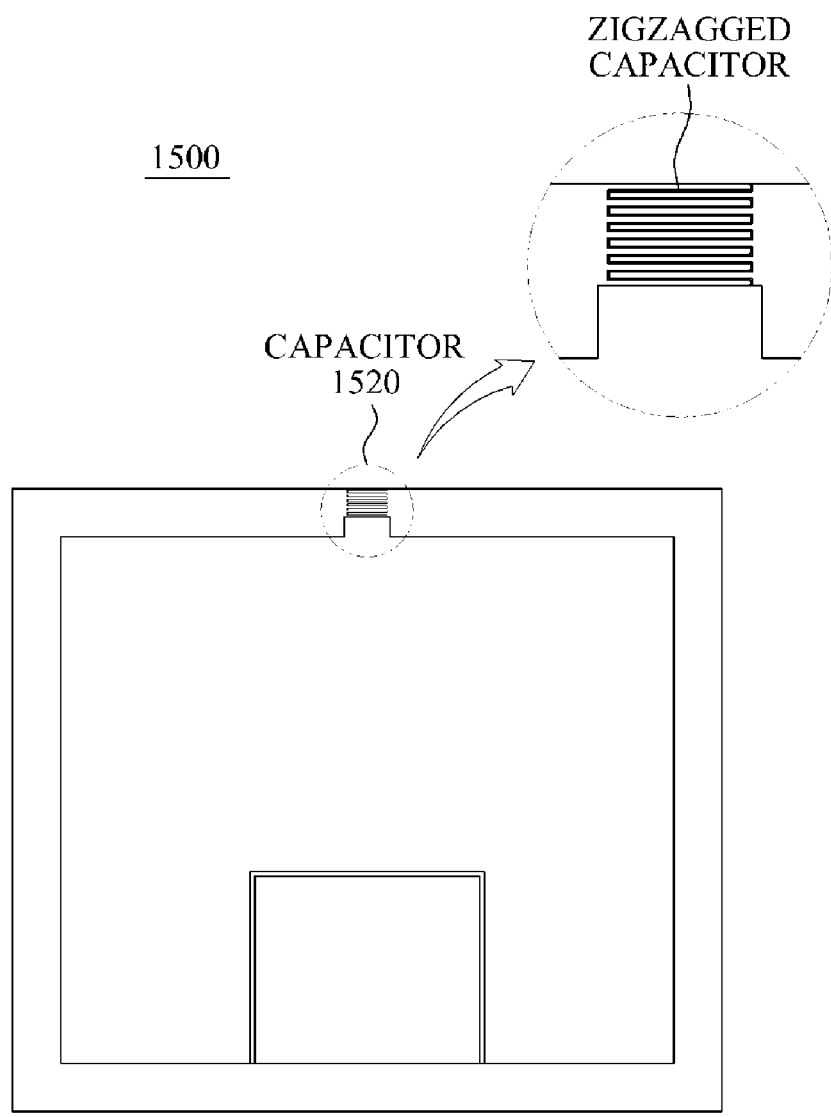

FIG. 15 illustrates a resonator 1500 for wireless power transmission including a distributed capacitor.

Referring to FIG. 15, a capacitor 1520 included in the resonator 1500 is configured for wireless power transmission. A capacitor used as a lumped element may have a relatively high equivalent series resistance (ESR). A variety of schemes have been proposed to decrease the ESR contained in the capacitor of the lumped element. In one embodiment, by using the capacitor 1520 as a distributed element, it may be possible to decrease the ESR. As will be appreciated, a loss caused by the ESR may decrease a Q-factor and a coupling effect.

As illustrated in FIG. 15, the capacitor 1520 may be configured with a zigzagged conductive line and a dielectric material.

By employing the capacitor 1520 as the distributed element, it may be possible to decrease the loss occurring due to the ESR in some instances. In addition, by disposing, in parallel, a plurality of capacitors as lumped elements, it may be possible to decrease the loss occurring due to the ESR. Since a resistance of each of the capacitors as the lumped elements decreases through a parallel connection, active resistances of parallel-connected capacitors as the lumped elements may also decrease such that the loss occurring due to the ESR may decrease. For example, by employing ten capacitors of 1 pF each instead of using a single capacitor of 10 pF, it may be possible to decrease the loss occurring due to the ESR.

Figure 16:
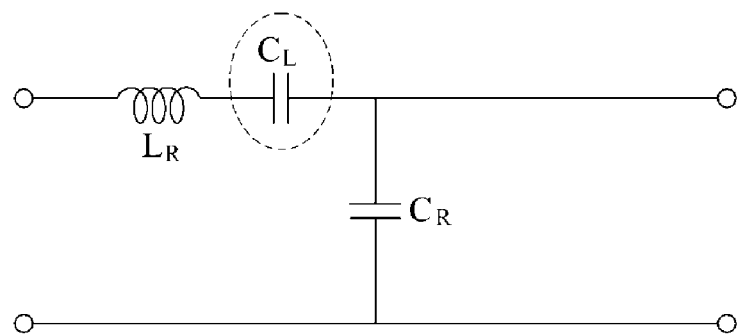
FIG. 16 is a diagram illustrating one equivalent circuit of a resonator of FIG. 11.

FIG. 16 illustrates one equivalent circuit of the resonator of FIG. 11.

The resonator of FIG. 11 of FIG. 11 used in wireless power transmission may be modeled to the equivalent circuit of FIG. 16. In the equivalent circuit depicted in FIG. 16, $L_R$ denotes an inductance of the power transmission line, $C_L$ denotes the capacitor 1120 that is inserted in a form of a lumped element in the middle of the power transmission line, and $C_R$ denotes a capacitance between the power transmissions and/or ground of FIG. 11.

In some instances, the resonator of FIG. 11 may have a zeroth resonance characteristic. For example, when a propagation constant is "0", the resonator of FIG. 11 may be assumed to have $\omega_{MZR}$ as a resonance frequency. The resonance frequency $\omega_{MZR}$ may be expressed by Equation 6.

$$\omega_{MZR} = \frac{1}{\sqrt{L_R C_L}} \quad \text{[Equation 6]}$$

In Equation 6, MZR denotes a Mu zero resonator.

Referring to Equation 6, the resonance frequency $\omega_{MZR}$ of the resonator of FIG. 11 may be determined by $L_R/C_L$. The physical size of the resonator of FIG. 11 and the resonance frequency $\omega_{MZR}$ may be independent with respect to each other, in various embodiments. Since the physical sizes are independent with respect to each other, the physical size of the resonator of FIG. 11 may be sufficiently reduced.

Figure 17:
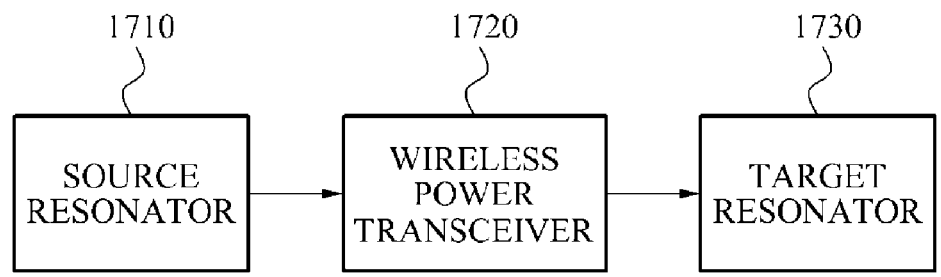
FIG. 17 is a block diagram illustrating another wireless power transmission system.

FIG. 17 illustrates another wireless power transmission system.

Referring to FIG. 17, the wireless power transmission system includes a source resonator 1710, a wireless power transceiver 1720, and a target resonator 1730.

The wireless power transceiver 1720 may receive power from the source resonator 1710, and may transfer the received power to the target resonator 1730. To increase the transmission efficiency of the power transmitted from the source resonator 1710 to the target resonator 1730, the wireless power transceiver 1720 may be installed in an optimal position between the source resonator 1710 and the target resonator 1730.

The wireless power transceiver 1720 may include a reception resonator, and a transmission resonator. The reception resonator may be configured to receive wireless power from the source resonator 1710, and the transmission resonator may transmit the wireless power to the target resonator 1730. The reception resonator and the transmission resonator may be configured, for example, as a single resonator, or as at least two resonators.

Additionally, the wireless power transceiver 1720 may further include a sub-resonator, and a magnetic field distribution controller. The magnetic field distribution controller may control distribution of a magnetic field formed within the transmission resonator in the wireless power transceiver 1720. The sub-resonator may be configured, for example, as one of structures illustrated in FIGS. 8 and 10, or as another structure that enables functions of a resonator.

The magnetic field distribution controller may control the direction of current flowing in the transmission resonator, or the direction of current flowing in the sub-resonator, and may control the distribution of the magnetic field formed within the transmission resonator. The direction of the current flowing in the sub-resonator may be determined based on the ratio of the resonance frequency of the sub-resonator with respect to the resonance frequency of the transmission resonator, for example.

The magnetic field distribution controller may control the resonance frequency of the transmission resonator, or the resonance frequency of the sub-resonator. For example, when the resonance frequency of the transmission resonator is equal to the resonance frequency of the sub-resonator, the strength of the magnetic field in the center of the transmission resonator may increase. Thus, the wireless power transmission efficiency of the wireless power transceiver 1720 may be increased. Additionally, due to an increase in the strength of the magnetic field in the center of the transmission resonator, an area enabling transfer of the wireless power may be widened. Accordingly, it may be possible to transmit the wireless power to the target resonator 1730 a farther distance.

Figure 18:
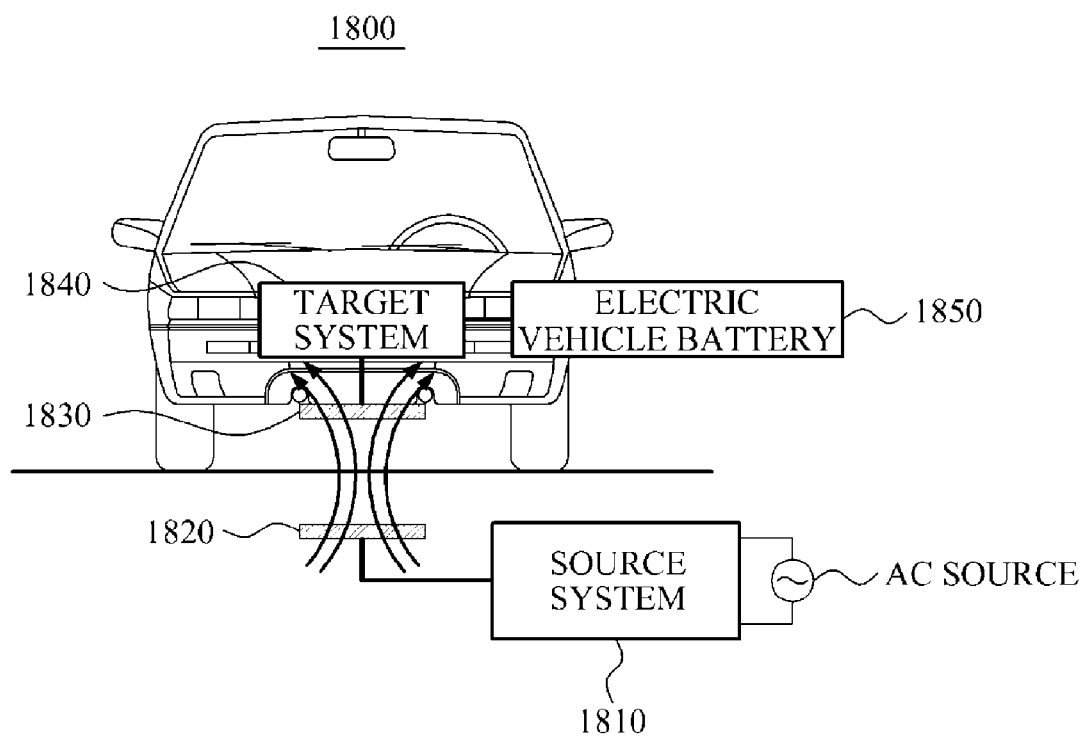
FIG. 18 illustrates an electric vehicle charging system.

FIG. 18 illustrates an electric vehicle charging system.

Referring to FIG. 18, an electric vehicle charging system 1800 includes a source system 1810, a source resonator 1820, a target resonator 1830, a target system 1840, and an electric vehicle battery 1850.

The electric vehicle charging system 1800 may have a similar structure to the wireless power transmission system of FIG. 1. The source system 1810 and the source resonator 1820 in the electric vehicle charging system 1800 may function as a source. Additionally, the target resonator 1830 and the target system 1840 in the electric vehicle charging system 1800 may function as a target.

The source system 1810 may include an alternating current-to-direct current (AC/DC) converter, a power detector, a power converter, a control/communication unit, similarly to the source 110 of FIG. 1. The target system 1840 may include a rectification unit, a DC-to-DC (DC/DC) converter, a switch unit, a charging unit, and a control/communication unit, similarly to the target 120 of FIG. 1.

The electric vehicle battery 1850 may be charged by the target system 1840.

The electric vehicle charging system 1800 may use a resonant frequency in a band of a few kilohertz (KHz) to tens of MHz.

The source system 1810 may generate power, based on a type of charging vehicle, a capacity of a battery, and a charging state of a battery, and may supply the generated power to the target system 1840.

The source system 1810 may control the source resonator 1820 and the target resonator 1830 to be aligned. For example, when the source resonator 1820 and the target resonator 1830 are not aligned, the controller of the source system 1810 may transmit a message to the target system 1840, and may control alignment between the source resonator 1820 and the target resonator 1830.

For example, when the target resonator 1830 is not located in a position enabling maximum magnetic resonance, the source resonator 1820 and the target resonator 1830 may not be aligned. When a vehicle does not stop accurately, the source system 1810 may induce a position of the vehicle to be adjusted, and may control the source resonator 1820 and the target resonator 1830 to be aligned.

The source system 1810 and the target system 1840 may transmit or receive an ID of a vehicle, or may exchange various messages, through communication.

The descriptions of FIGS. 5 through 17 may be applied to the electric vehicle charging system 1800. However, the electric vehicle charging system 1800 may use a resonant frequency in a band of a few KHz to tens of MHz, and may transmit power that is equal to or higher than tens of watts to charge the electric vehicle battery 1850.

As described above, according to various embodiments, in a wireless power transmission system, a magnetic field distribution controller may increase or reduce the strength of a magnetic field formed within a source resonator, by controlling the ratio of a resonance frequency of a sub-resonator with respect to a resonance frequency of the source resonator.

Additionally, according to various embodiments, a magnetic field formed within a source resonator may be controlled to be uniformly distributed and thus, it may be possible to generate a constant input impedance, regardless of a position of a target device positioned on the source resonator.

Furthermore, according to various embodiments, a constant input impedance may be generated between a source resonator and a target device and thus, it may be possible to easily perform impedance matching between the source resonator and the target device.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
 a source resonator configured to wirelessly transmit power to a target device;
 at least one sub-resonator positioned inside of the source resonator; and
 a controller configured to determine a direction of current flowing in the at least one sub-resonator based on a radio between a resonance frequency of the source resonator and a resonance frequency of the at least one sub-resonator,
 wherein a distribution of a magnetic field is controlled based on the direction.

2. The wireless power transmitter of claim 1, wherein the source resonator comprises:
 a first transmission line comprising a first signal conducting portion, a second signal conducting portion, and a first ground conducting portion, the first ground conducting portion corresponding to the first signal conducting portion and the second signal conducting portion;

a first conductor electrically connecting the first signal conducting portion to the first ground conducting portion;

a second conductor electrically connecting the second signal conducting portion to the first ground conducting portion; and at least one first capacitor inserted between the first signal conducting portion and the second signal conducting portion, in series with respect to current flowing through the first signal conducting portion and the second signal conducting portion.

3. The wireless power transmitter of claim 2, wherein the first transmission line, the first conductor, and the second conductor form a loop structure.

4. The wireless power transmitter of claim 3, further comprising:
a matcher configured to determine an impedance of the source resonator, the matcher being located within the loop structure.

5. The wireless power transmitter of claim 1, wherein the controller controls the resonance frequency of the at least one sub-resonator to have a value greater than the resonance frequency of the source resonator, so that the strength of the magnetic field within the at least one sub-resonator is increased and the strength of the magnetic field in a region between the at least one sub-resonator and the source resonator is reduced.

6. The wireless power transmitter of claim 1, wherein the controller controls the resonance frequency of the at least one sub-resonator to have a value less than the resonance frequency of the source resonator, so that the strength of the magnetic field within the at least one sub-resonator is reduced and the strength of the magnetic field in a region between the at least one sub-resonator and the source resonator is increased.

7. The wireless power transmitter of claim 1, wherein the controller controls one or more resonance frequencies of a plurality of sub-resonators located in a predetermined area within the source resonator to have values less than or greater than the resonance frequency of the source resonator, and controls the strength of the magnetic field within one or more of the plurality of sub-resonators, and the strength of the magnetic field in a region between the source resonator and one or more of the plurality of sub-resonators.

8. The wireless power transmitter of claim 1, wherein the source resonator comprises a spiral resonator formed by winding a coil in a spiral shape.

9. The wireless power transmitter of claim 1, wherein the at least one sub-resonator comprises:
a second transmission line comprising a third signal conducting portion, a fourth signal conducting portion, and a second ground conducting portion, the second ground conducting portion corresponding to the third signal conducting portion and the fourth signal conducting portion;
a third conductor electrically connecting the third signal conducting portion to the second ground conducting portion;
a fourth conductor electrically connecting the fourth signal conducting portion to the second ground conducting portion; and
at least one second capacitor inserted between the third signal conducting portion and the fourth signal conducting portion, in series with respect to current flowing through the third signal conducting portion and the fourth signal conducting portion.

10. The wireless power transmitter of claim 9, wherein the controller controls the resonance frequency of the at least one sub-resonator, by controlling a capacitance of the at least one second capacitor, or the length, the width, or both of the second transmission line.

11. The wireless power transmitter of claim 9, wherein the second transmission line, the third conductor, and the fourth conductor form a rectangular loop structure.

12. The wireless power transmitter of claim 9, wherein the second transmission line, the third conductor, and the fourth conductor form a circular loop structure.

13. The wireless power transmitter of claim 9, wherein the second transmission line, the third conductor, and the fourth conductor form a cross-shaped loop structure.

14. The wireless power transmitter of claim 1, wherein the at least one sub-resonator comprises at least one sub-sub-resonator that is located within the at least one sub-resonator that is configured to support the at least one sub-resonator and to increase or reduce the strength of the magnetic field when the power is wirelessly transmitted.

15. The wireless power transmitter of claim 1, wherein the at least one sub-resonator comprises a meta-resonator, a spiral resonator, or a helical resonator.

16. A wireless power transmission method comprising:
wirelessly transmitting power to a target device via a source resonator;
determining a direction of current flowing in at least one sub-resonator based on a ratio between a resonance frequency of the source resonator and a resonance frequency of the at least one sub-resonator, the at least one sub-resonator positioned inside of the source resonator,
wherein a distribution of a magnetic field is controlled based on the direction.

17. The wireless power transmission method of claim 16, wherein the controlling comprises controlling the resonance frequency of the at least one sub-resonator to have a value greater than the resonance frequency of the source resonator, so that the strength of the magnetic field formed in the at least one sub-resonator is increased and the strength of the magnetic field formed between the at least one sub-resonator and the source resonator is reduced.

18. The wireless power transmission method of claim 16, wherein the controlling comprises controlling the resonance frequency of the at least one sub-resonator to have a value less than the resonance frequency of the source resonator, so that the strength of the magnetic field formed in the at least one sub-resonator is reduced and the strength of the magnetic field formed between the at least one sub-resonator and the source resonator is increased.

19. The wireless power transmission method of claim 16, wherein the controlling comprises controlling one or more of resonance frequencies of a plurality of sub-resonators located in a predetermined area within the source resonator to have values less than or greater than the resonance frequency of the source resonator, and controlling the strength of the magnetic field within one or more of the plurality of sub-resonators, and the strength of the magnetic field in a region between the source resonator and one or more of the plurality of sub-resonators.

20. The wireless power transmission method of claim 16, wherein the controlling comprises controlling the resonance frequency of the at least one sub-resonator, by controlling a capacitance of at least one capacitor, or the length, the width, or both, of a transmission line.

* * * * *